United States Patent
Joshi et al.

(10) Patent No.: US 11,726,764 B2
(45) Date of Patent: Aug. 15, 2023

(54) UPGRADE SYSTEMS FOR SERVICE DOMAINS

(71) Applicant: Nutanix, Inc., San Jose, CA (US)

(72) Inventors: Akhilesh Joshi, San Jose, CA (US); Kevin Thomas, San Jose, CA (US); Gaurav Poothia, Redmond, WA (US); Naorem Khogendro Singh, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/148,231

(22) Filed: Jan. 13, 2021

(65) Prior Publication Data

US 2022/0147336 A1    May 12, 2022

Related U.S. Application Data

(60) Provisional application No. 63/112,455, filed on Nov. 11, 2020, provisional application No. 63/132,765, filed on Dec. 31, 2020.

(51) Int. Cl.
  *G06F 8/65* (2018.01)
  *G06F 21/57* (2013.01)
  *H04L 41/082* (2022.01)

(52) U.S. Cl.
  CPC ............ *G06F 8/65* (2013.01); *G06F 21/572* (2013.01); *H04L 41/082* (2013.01); *G06F 2221/033* (2013.01)

(58) Field of Classification Search
  CPC .... G06F 8/65; G06F 21/572; G06F 2221/033; H04L 41/082

(Continued)

(56) References Cited

U.S. PATENT DOCUMENTS 7,237,360 B2    7/2007  Moncho et al.
7,310,664 B1   12/2007  Merchant et al.
(Continued)

FOREIGN PATENT DOCUMENTS

CN    101916200        8/2015
CN    110795442 B      4/2022
(Continued)

OTHER PUBLICATIONS

Paladi et al., "Domain Based Storage Protection with Secure Access Control for the Cloud", 2014, [Online], pp. 35-42, [Retrieved from internet on Oct. 13, 2022], < https://dl.acm.org/doi/pdf/10.1145/2600075.2600082> (Year: 2014).*

(Continued)

*Primary Examiner* — S. Sough
*Assistant Examiner* — Zengpu Wei
(74) *Attorney, Agent, or Firm* — Stoel Rives LLP

(57) ABSTRACT

Non-transitory computer readable media are encoded with instructions which, when executed by one or more processors of a central computing system, cause the central computing system to connect with multiple service domains and determine that at least one service domain of the multiple service domains is eligible for upgrade. The instructions further cause the central computing system to store an upgrade package for the at least one service domain at a storage service separate from the central computing system and communicate access credentials to the storage service to the at least one service domain. The central computing system receives a communication from the at least one service domain indicative of upgrade status responsive to the at least one service domain having accessed the upgrade package at the storage service and updates a state management database based on the communication.

30 Claims, 10 Drawing Sheets

(58) Field of Classification Search
USPC .......................................................... 717/169
See application file for complete search history.

(56) References Cited

U.S. PATENT DOCUMENTS

| | | |
|---|---|---|
| 8,543,665 B2 | 9/2013 | Ansari et al. |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,210,534 B1 | 12/2015 | Matthieu et al. |
| 9,244,951 B2 | 1/2016 | Mandelstein et al. |
| 9,253,252 B2 | 2/2016 | Agarwal et al. |
| 9,336,132 B1 | 5/2016 | Aron et al. |
| 9,600,494 B2 | 3/2017 | Maluf et al. |
| 9,606,794 B1 | 3/2017 | Chou et al. |
| 9,633,197 B2 | 4/2017 | Lakshmanan et al. |
| 9,634,893 B2 | 4/2017 | Boutros et al. |
| 9,641,650 B2 | 5/2017 | Virkki et al. |
| 9,652,265 B1 | 5/2017 | Narayanasamy et al. |
| 9,684,502 B2 | 6/2017 | Fu et al. |
| 9,729,411 B2 | 8/2017 | Purusothaman |
| 9,736,194 B1 | 8/2017 | Rao et al. |
| 9,747,287 B1 | 8/2017 | Bhardwaj et al. |
| 9,772,866 B1 | 9/2017 | Aron et al. |
| 9,836,296 B2 | 12/2017 | Vandikas et al. |
| 9,860,677 B1 | 1/2018 | Agerstam et al. |
| 9,917,865 B2 | 3/2018 | Arora et al. |
| 9,977,415 B2 | 5/2018 | Zimmerman et al. |
| 10,091,270 B2 | 10/2018 | Fang |
| 10,149,154 B2 | 12/2018 | Zimmerman et al. |
| 10,156,842 B2 | 12/2018 | Wu et al. |
| 10,181,978 B1 | 1/2019 | Argenti |
| 10,225,335 B2 | 3/2019 | Fu et al. |
| 10,230,798 B2 | 3/2019 | Doraiswamy et al. |
| 10,262,019 B1 | 4/2019 | Reiner et al. |
| 10,291,714 B2 | 5/2019 | Mathews et al. |
| 10,306,513 B2 | 5/2019 | Bartfai-walcott |
| 10,489,138 B1 * | 11/2019 | Wu ........................ H04L 41/08 |
| 10,515,119 B2 | 12/2019 | Kirk et al. |
| 10,534,629 B1 | 1/2020 | St. Pierre et al. |
| 10,567,925 B2 | 2/2020 | Ly et al. |
| 10,652,226 B2 | 5/2020 | Islam et al. |
| 10,838,833 B1 | 11/2020 | Jibaja et al. |
| 10,893,116 B1 | 1/2021 | Koehler |
| 10,924,342 B2 | 2/2021 | Joshi et al. |
| 11,194,483 B1 | 12/2021 | Dontu et al. |
| 11,316,733 B1 | 4/2022 | Johnson et al. |
| 11,501,881 B2 | 11/2022 | Patil et al. |
| 2002/0143819 A1 | 10/2002 | Han et al. |
| 2004/0177359 A1 | 9/2004 | Bauch et al. |
| 2005/0060328 A1 | 3/2005 | Suhonen et al. |
| 2008/0270515 A1 | 10/2008 | Chen et al. |
| 2009/0204711 A1 | 8/2009 | Binyamin |
| 2009/0260004 A1 * | 10/2009 | Datta ........................ G06F 8/65 |
| | | 717/175 |
| 2010/0008510 A1 * | 1/2010 | Zayas ...................... G06F 21/572 |
| | | 713/193 |
| 2010/0077473 A1 | 3/2010 | Takeshita et al. |
| 2010/0175061 A1 * | 7/2010 | Maeda ...................... G06F 8/65 |
| | | 717/173 |
| 2011/0153824 A1 | 6/2011 | Chikando et al. |
| 2011/0231899 A1 | 9/2011 | Pulier et al. |
| 2011/0251992 A1 | 10/2011 | Bethlehem et al. |
| 2011/0265077 A1 | 10/2011 | Collison et al. |
| 2012/0102486 A1 | 4/2012 | Yendluri |
| 2012/0265884 A1 | 10/2012 | Zhang et al. |
| 2012/0266156 A1 | 10/2012 | Spivak et al. |
| 2012/0281708 A1 | 11/2012 | Chauhan et al. |
| 2013/0219479 A1 | 8/2013 | Desoto et al. |
| 2013/0304903 A1 | 11/2013 | Mick et al. |
| 2013/0332916 A1 * | 12/2013 | Chinn ........................ G06F 9/44 |
| | | 717/169 |
| 2014/0000745 A1 | 1/2014 | Doering et al. |
| 2014/0075412 A1 | 3/2014 | Kannan et al. |
| 2014/0075431 A1 | 3/2014 | Kumar et al. |
| 2014/0164486 A1 | 6/2014 | Ravinchandran et al. |
| 2014/0279899 A1 | 9/2014 | Gu et al. |
| 2014/0317261 A1 | 10/2014 | Shatzkamer |
| 2014/0330948 A1 | 11/2014 | Dunn et al. |
| 2014/0372508 A1 | 12/2014 | Fausak et al. |
| 2015/0057817 A1 | 2/2015 | Endrizzi et al. |
| 2015/0067030 A1 | 3/2015 | Smith et al. |
| 2015/0074106 A1 | 3/2015 | Ji |
| 2015/0120893 A1 | 4/2015 | Sapaliga et al. |
| 2015/0261876 A1 | 9/2015 | Trikha et al. |
| 2015/0347542 A1 | 12/2015 | Sullivan et al. |
| 2016/0007138 A1 | 1/2016 | Palanisamy et al. |
| 2016/0092176 A1 | 3/2016 | Straub et al. |
| 2016/0092180 A1 | 3/2016 | Straub |
| 2016/0092348 A1 | 3/2016 | Straub et al. |
| 2016/0094398 A1 | 3/2016 | Choudhury et al. |
| 2016/0098265 A1 * | 4/2016 | Mahajan ................. H04L 67/34 |
| | | 717/170 |
| 2016/0112268 A1 | 4/2016 | Chung et al. |
| 2016/0156614 A1 | 6/2016 | Jain et al. |
| 2016/0197830 A1 | 7/2016 | Ulevitch et al. |
| 2016/0202964 A1 * | 7/2016 | Butcher ..................... G06F 8/65 |
| | | 717/172 |
| 2016/0216959 A1 * | 7/2016 | Kurian .................... H04L 67/10 |
| 2016/0315848 A1 | 10/2016 | Weinstein |
| 2016/0315912 A1 | 10/2016 | Mayya et al. |
| 2016/0323161 A1 | 11/2016 | Cuervo Laffaye et al. |
| 2016/0323361 A1 | 11/2016 | Austel et al. |
| 2016/0337104 A1 | 11/2016 | Kalligudd |
| 2016/0337175 A1 | 11/2016 | Rao |
| 2016/0342906 A1 | 11/2016 | Shaashua et al. |
| 2016/0344745 A1 | 11/2016 | Johnson et al. |
| 2016/0345516 A1 | 12/2016 | Britt et al. |
| 2016/0357525 A1 | 12/2016 | Wee et al. |
| 2017/0005820 A1 | 1/2017 | Zimmerman et al. |
| 2017/0006135 A1 | 1/2017 | Siebel et al. |
| 2017/0048079 A1 | 2/2017 | Nethi et al. |
| 2017/0060574 A1 | 3/2017 | Malladi et al. |
| 2017/0099176 A1 | 4/2017 | Jain |
| 2017/0102931 A1 | 4/2017 | Risbood et al. |
| 2017/0123939 A1 | 5/2017 | Maheshwari et al. |
| 2017/0126809 A1 | 5/2017 | Chen et al. |
| 2017/0142068 A1 | 5/2017 | Devarajan et al. |
| 2017/0149931 A1 | 5/2017 | Lochhead et al. |
| 2017/0168813 A1 | 6/2017 | Pogrebinsky et al. |
| 2017/0171607 A1 | 6/2017 | Britt |
| 2017/0177334 A1 | 6/2017 | Chou et al. |
| 2017/0177877 A1 * | 6/2017 | Suarez ................. G06F 16/2455 |
| 2017/0180346 A1 * | 6/2017 | Suarez ..................... G06F 8/71 |
| 2017/0185507 A1 | 6/2017 | Eberlein |
| 2017/0185922 A1 | 6/2017 | Lange et al. |
| 2017/0187807 A1 | 6/2017 | Clernon |
| 2017/0201585 A1 | 7/2017 | Doraiswamy et al. |
| 2017/0244600 A1 | 8/2017 | Hussein et al. |
| 2017/0257432 A1 | 9/2017 | Fu et al. |
| 2017/0289173 A1 * | 10/2017 | Resch ....................... G06F 8/65 |
| 2017/0315820 A1 | 11/2017 | Entezari et al. |
| 2017/0347264 A1 | 11/2017 | Holland et al. |
| 2018/0007055 A1 | 1/2018 | Infante-Lopez et al. |
| 2018/0013819 A1 | 1/2018 | Li |
| 2018/0034914 A1 | 2/2018 | Christopher et al. |
| 2018/0054315 A1 | 2/2018 | Liu et al. |
| 2018/0054490 A1 | 2/2018 | Wadhwa et al. |
| 2018/0067830 A1 | 3/2018 | Jagtiani et al. |
| 2018/0092151 A1 | 3/2018 | Liu et al. |
| 2018/0101415 A1 | 4/2018 | Mahindru et al. |
| 2018/0109395 A1 | 4/2018 | Berdy et al. |
| 2018/0109650 A1 | 4/2018 | Berdy et al. |
| 2018/0109929 A1 | 4/2018 | Ly et al. |
| 2018/0123820 A1 | 5/2018 | Kim |
| 2018/0159745 A1 | 6/2018 | Byers et al. |
| 2018/0167392 A1 | 6/2018 | Zakaria |
| 2018/0212970 A1 | 7/2018 | Chen et al. |
| 2018/0219877 A1 | 8/2018 | Hsu et al. |
| 2018/0234351 A1 | 8/2018 | Amenta et al. |
| 2018/0293463 A1 | 10/2018 | Brown |

(56) References Cited

U.S. PATENT DOCUMENTS

| | | |
|---|---|---|
| 2018/0295194 A1 | 10/2018 | Deraz et al. |
| 2018/0300124 A1 | 10/2018 | Malladi et al. |
| 2018/0302266 A1 | 10/2018 | Makovsky et al. |
| 2018/0307464 A1 | 10/2018 | Bijani et al. |
| 2018/0307537 A1 | 10/2018 | Chen et al. |
| 2018/0309819 A1 | 10/2018 | Thompson |
| 2018/0314808 A1 | 11/2018 | Casey et al. |
| 2018/0324204 A1 | 11/2018 | Mcclory et al. |
| 2018/0332116 A1 | 11/2018 | George et al. |
| 2018/0338242 A1 | 11/2018 | Li et al. |
| 2018/0373419 A1 | 12/2018 | Chen et al. |
| 2018/0373555 A1 | 12/2018 | Gupta et al. |
| 2019/0014048 A1 | 1/2019 | Krishna Singuru |
| 2019/0018951 A1 | 1/2019 | James et al. |
| 2019/0026082 A1 | 1/2019 | Shalev et al. |
| 2019/0041824 A1 | 2/2019 | Chavez et al. |
| 2019/0045033 A1 | 2/2019 | Agerstam et al. |
| 2019/0068445 A1 | 2/2019 | Chauhan et al. |
| 2019/0087220 A1 | 3/2019 | Turner |
| 2019/0098113 A1 | 3/2019 | Park et al. |
| 2019/0109816 A1 | 4/2019 | Liu et al. |
| 2019/0121889 A1 | 4/2019 | Gold et al. |
| 2019/0123959 A1 | 4/2019 | Joshi et al. |
| 2019/0141022 A1 | 5/2019 | Reeve et al. |
| 2019/0146773 A1* | 5/2019 | Attard .................. G06F 8/61 717/169 |
| 2019/0158353 A1 | 5/2019 | Johnson et al. |
| 2019/0158600 A1 | 5/2019 | Cook |
| 2019/0182333 A1 | 6/2019 | Bartfai-Walcott et al. |
| 2019/0188742 A1 | 6/2019 | Vasudevan et al. |
| 2019/0190776 A1 | 6/2019 | Bregman et al. |
| 2019/0213273 A1 | 7/2019 | Vasudevan et al. |
| 2019/0251166 A1 | 8/2019 | Penrose et al. |
| 2019/0286353 A1 | 9/2019 | Soni et al. |
| 2019/0295012 A1 | 9/2019 | Marinescu et al. |
| 2019/0319919 A1 | 10/2019 | Knecht et al. |
| 2019/0320038 A1 | 10/2019 | Walsh et al. |
| 2019/0342182 A1* | 11/2019 | Dhanabalan .......... H04L 41/082 |
| 2020/0014607 A1 | 1/2020 | Gangaadhar et al. |
| 2020/0014633 A1 | 1/2020 | You et al. |
| 2020/0034776 A1 | 1/2020 | Peran et al. |
| 2020/0073739 A1 | 3/2020 | Rungta et al. |
| 2020/0092789 A1* | 3/2020 | Lee ..................... H04W 40/22 |
| 2020/0097274 A1* | 3/2020 | Sarkar ................ G06F 11/1433 |
| 2020/0104723 A1 | 4/2020 | Reissner et al. |
| 2020/0112487 A1 | 4/2020 | Inamdar et al. |
| 2020/0122038 A1 | 4/2020 | Ebrahimi et al. |
| 2020/0127832 A1 | 4/2020 | Ebrahimi |
| 2020/0177503 A1 | 6/2020 | Hooda et al. |
| 2020/0177630 A1 | 6/2020 | Penner et al. |
| 2020/0218580 A1 | 7/2020 | Kim |
| 2020/0258627 A1 | 8/2020 | Setegn et al. |
| 2020/0274776 A1* | 8/2020 | Nishikawa ........... H04L 41/082 |
| 2020/0287737 A1 | 9/2020 | Mishra et al. |
| 2020/0336467 A1 | 10/2020 | Subbarayan et al. |
| 2020/0356415 A1 | 11/2020 | Goli |
| 2021/0004270 A1 | 1/2021 | Singh et al. |
| 2021/0005330 A1 | 1/2021 | Patil et al. |
| 2021/0006636 A1 | 1/2021 | Koehler et al. |
| 2021/0042104 A1 | 2/2021 | Tashkandi |
| 2021/0042160 A1 | 2/2021 | Alamouti et al. |
| 2021/0044579 A1* | 2/2021 | Nelson-Gal .......... H04L 41/046 |
| 2021/0067607 A1* | 3/2021 | Gardner ................ H04L 67/34 |
| 2021/0084670 A1* | 3/2021 | Chauhan .......... H04W 72/1289 |
| 2021/0089408 A1 | 3/2021 | Park et al. |
| 2021/0112059 A1 | 4/2021 | Heldman et al. |
| 2021/0112128 A1 | 4/2021 | Joshi et al. |
| 2021/0140815 A1 | 5/2021 | Pretorius et al. |
| 2021/0160338 A1 | 5/2021 | Koehler et al. |
| 2021/0255846 A1 | 8/2021 | Mamgain et al. |
| 2021/0311764 A1 | 10/2021 | Rosoff et al. |
| 2021/0342193 A1 | 11/2021 | Anand |
| 2021/0373965 A1 | 12/2021 | Hadas et al. |
| 2021/0400043 A1* | 12/2021 | Su .......................... G06F 21/57 |
| 2022/0083389 A1 | 3/2022 | Poothia et al. |
| 2022/0121543 A1 | 4/2022 | Poothia et al. |
| 2022/0138070 A1 | 5/2022 | Mokashi et al. |
| 2022/0159093 A1 | 5/2022 | Joshi |
| 2022/0279046 A1 | 9/2022 | Perng et al. |

FOREIGN PATENT DOCUMENTS

| | | |
|---|---|---|
| EP | 2831746 A4 | 2/2015 |
| WO | 99945465 A1 | 9/1999 |
| WO | 2014007811 A1 | 1/2014 |
| WO | 2020096639 A1 | 2/2020 |

OTHER PUBLICATIONS

Harnik et al, "Secure Access Mechanism for Cloud Storage", 2011, [Online], pp. 317-336, [Retrieved from internet on Feb. 14, 2023], <https://scpe.org/index.php/scpe/article/view/727> (Year: 2011).*

Beguelin, Daniel "Turn Your Smartphone Into an IoT Device", IBM Developer https://developer.ibm.com/tutorials/iot-mobile-phone-iot-device-bluemix-apps-trs/, Nov. 10, 2015, pp. 1-12.

U.S. Appl. No. 16/522,567, titled "Appartus and Method for Deploying a Machine Learning Inference as a Service at Edge Systems", dated Jul. 25, 2019, pp. all.

U.S. Appl. No. 16/666,242, titled "Scalable Centralized Internet-Ofthings Manager", dated Oct. 28, 2019, pp. all.

U.S. Appl. No. 16/920,235, titled "Apparatus and Method for Deploying a Mobile Device as a Data Source in an IOT System", dated Jul. 2, 2020, pp. all.

U.S. Appl. No. 16/945,306, titled "Platform-As-A-Service Deployment Including Service Domains", dated Jul. 31, 2020, pp. all.

U.S. Appl. No. 17/139,325 titled "Key Value Store in a Clustered Containerized System" filed Dec. 31, 2020, pp. all.

U.S. Appl. No. 17/187,220 titled "Generic Proxy Endpoints Using Protocol Tunnels Including Life Cycle Management and Examples for Distributed Cloud Native Services and Applications" filed Feb. 26, 2021, pp. all.

U.S. Appl. No. 17/302,189 titled "User Interface and Health Status Monitoring for a Multi Service Domainsystem" filed Apr. 27, 2021, pp. all.

U.S. Appl. No. 17/350,636 titled "AI Inference Hardware Resource Scheduling" filed Jun. 17, 2021, pp. ail.

U.S. Appl. No. 16/522,567 titled "Machine Inference as a Service" filed Jul. 25, 2019, pp. all.

"BtrPlace: An Open-Source Flexible Virtual Machine Scheduler", University Nice Sophia Antipolis, pp. 1-8.

"Multi-Process Service", Nvidia, vR450, https://docs.nvidia.com/deploy/pdf/CUDA_Multi_Process_Service_Overview.pdf, Jun. 2020, pp. 1-28.

"TensorFlow Serving", GitHub, https://github.com/tensorflow/serving, pp. 1-4.

Abadi, Martin et al., "TensorFlow: Large-Scale Machine Learning on Heterogeneous Distributed Systems", Preliminary White Paper, http://download.tensorflow.org/paper/whitepaper2015.pdf, Nov. 9, 2015, pp. 1-19.

Goldsborough, Peter et al., "A Tour of TensorFlow: Proseminar Data Mining", Technische Universität München, https://arxiv.org/pdf/1610.01178.pdf, Oct. 2016, pp. 1-16.

Grammatikou, Mary et al., "GEMBus as a Service Oriented Platform for Cloud-Based Composable Services", 2011 IEEE Third International Conference on Cloud Computing Technology and Science, Nov. 1, 2011, pp. 666-671.

Hermann, Jeremy et al., "Meet Michelangelo: Uber's Machine Learning Platform", Uber Engineering, https://eng.uber.com/michelangelo-machine-learning-platform/, Sep. 5, 2017, pp. 1-17.

Hoare, Suchismita et al., "A Semantic-Agent Framework for PaaS Interoperability", 2016 International IEEE Conferences on Ubiquitous Intelligence & Computing, Advanced and Trusted Computing, Scalable Computing and Communications, Cloud and Big Data Computing, Internet of People, and Smart World Congress, Jul. 18, 2016, pp. 788-793.

Jain, Paras et al., "Dynamic Space-Time Scheduling for GPU Inference", Massachusetts Institute of Technology, University of California, Berkeley; http://learningsys.org/nips18/assets/papers/

(56) References Cited

OTHER PUBLICATIONS

102CameraReadySubmissionGPU_Virtualization%20(8).pdf, 32nd Conference on Neural Information Processing Systems, Dec. 31, 2018, pp. 1-8.

Khaddar, Ajana El M. et al., "Smartphone: the Ultimate IoT and IoE Device", IntechOpen, "Smartphones from an Applied Research Perspective", pp. 137-162 (Ch. 7), Nov. 2, 2017, http://dx.doi.org/10.5772/intechopen.69734.

Lacoste, M. et al., "User-Centric Security and Dependability in the Clouds-of-Clouds", IEEE Cloud Computing, Sep. 2016, 64-75.

Li, Li E. et al., "Scaling Machine Learning as a Service", Uber Technologies, Inc,, JMLR: Workshop and Conference Proceeding, http://proceedings.mlr.press/v67/li17a/li17a.pdf, 2016, pp. 16-29.

Mahajan, Kshiteej et al., "Themis: Fair and Efficient GPU Cluster Scheduling", Cornell University, ARXIV:1907.01484 [CS.DC], Published Oct. 29, 2019, 15 pages.

Mijumbi, Rashid et al., "Learning Algorithms for Dynamic Resource Allocation in Virtualised Networks", Universitat Polit'ecnica de Catalunya, 08034 Barcelona, Spain, Publication date unknown, 4 pages.

Poitras, , Poitras, Steven. "The Nutanix Bible" (Mar. 3, 2020), from https://nutanixbible.com/, pp. all.

Rafique, Ansar et al., "Towards Portability and Interoperability Support in Middleware for Hybrid Clouds", 2014 IEEE INFOCOM Workshop on Cross-Cloud Systems, Apr. 27, 2014, pp. 7-12.

Sun, Peng et al., "Towards Distributed Machine Learning in Shared Clusters: A Dynamically-Partitioned Approach", Cornell University: ARXIV: 1704.06738V1 [CS.CD], Published Apr. 22, 2017, 6 pages.

Warburton, Tim , "An Intro to GPU Architecture and Programming Models I Tim Warburton, Virginia Tech", YouTube, Argonne National Laboratory Training, https://www.youtube.com/watch?v=IGmPy8xpT4E, Sep. 25, 2017, pp. 1-3.

Poitras, Steven. "The Nutanix Bible"(Oct. 15, 2013), from http://stevenpoitras.com/the-nutanix-bible/ (Publication date base on indicated caputrue date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date byArchive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbibie.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbibie.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

"From Pilot to Production: Secure Workspace IoT Endpoint Management at Scale", VMWare, Inc. https://www.vmware.com/products/workspace-one/workspace-iot.html, pp. 1-3.

Stoks, Jessie , "Workspace IoT Series: How Industry 4.0 Will Transform Your Mobile Strategy", VMware End-User Computing Blog https://blogs.vmware.com/euc/2019/02/workspace-iot-mobile-strategy.html, Feb. 20, 2019, pp. 1-5.

U.S. Appl. No. 17/376,581 title "Common Services Model for Multi-Cloud Platform", filed Jul. 15, 2021.

"Anthos", Google Cloud https://cloud.google.com/anthos, Apr. 21, 2020, pp. 1-26.

"Architecting for the Cloud: AWS Best Practice", Amazon Web Services https://d1.awsstatic.com/whitepapers/AWS_Cloud_Best_Practices.pdf, Oct. 2018, pp. 1-50.

"Best Practices for Cloud Management", Service Now https://www.servicenow.com/content/dam/servicenow-assets/public/en-us/doc-type/resource-center/solution-brief/sb-cloud-management.pdf, Jun. 2017, pp. 1-2.

"Cisco Edge Intelligence At-a-Glance", Cisco https://www.cisco.com/c/en/ud/solutions/collateral/internet-of-things/at-a-glance-c45-743263.html, Nov. 3, 2020, pp. 1-3.

"Cisco Edge Intelligence Data Sheet", Cisco https://www.cisco.com/c/en/us/solutions/collateral/internet-of-things/datasheet-c78-743838.html, Aug. 17, 2020, pp. 1-8.

"Hybrid Cloud with AWS", AWS https://d1.awsstatic.com/whitepapers/hybrid-cloud-with-aws.pdf, Nov. 2020, pp. 1-20.

"IBM Edge Application Manager", IBM https://www.ibm.com/cloud/edge-application-manager, May 5, 2020.

"IoT at the Edge: Bringing intelligence to the edge using Cloud IoT (Cloud Next '18)", YouTube; Google Cloud Tech https://www.youtube.com/watch?v=-T9MNR-BI8I, Aug. 17, 2018, pp. 1.

"mPRM: An Overview", ProSyst http://documentation.bosch-si.com/iot/PRM/v6.0/welcome/mprm_functional.html, Jun. 13, 2017, pp. 1-3.

"Multicloud Application Patterns", VMWare Docs https://docs.vmware.com/en/VMware-Tanzu-Service-Mesh/services/concepts-guide/GUID-4123C2ED-EC61-4CDA-A38D-2A7454BDDA46.html, Jul. 7, 2020, pp. 1-2.

"Setting up ServiceNow Cloud Management", DxSherpa https://dxsherpa.com/blogs/setting-up-servicenow-cloud-management/, Jul. 19, 2018, pp. 1-10.

"VIDEO—Intro to IBM Edge Application Manager", IBM https://www.ibm.com/cloud/blog/intro-to-ibm-edge-application-manager, May 13, 2020, pp. 1-16.

"Welcome to Azure Arc", YouTube, Microsoft Azure https://www.youtube.com/watch?v=3zdJJ97pNT4, Feb. 19, 2020, pp. 1.

Carey, Scott, "The major hybrid cloud options compared: AWS Outposts vs Azure Stack vs Google Anthos", ComputerWorld https://www.computerworld.com/article/3428108/the-major-hybrid-cloud-options-compared-aws-outposts-vs-azure-stack-vs-google-anthos.html, Nov. 6, 2019, pp. 1-9.

Holzle, Urs , et al., "Introducing Anthos: An entirely new platform for managing applications in today's multi-cloud world", Google Cloud Blog https://cloud.google.com/blog/topics/hybrid-cloud/new-platform-for-managing-applications-in-todays-multi-cloud-world, Apr. 9, 2019, pp. 1-6.

Iyengar, Ashok , et al., "Clusters at the Edge", IBM https://www.ibm.com/cloud/blog/clusters-at-the-edge, Dec. 9, 2020, pp. 1-13.

Lewis, Sarah , "Cloudify", TechTarget https://www.techtarget.com/searchcloudcomputing/definition/Cloudify, Jun. 2019, pp. 1.

(56) References Cited

OTHER PUBLICATIONS

Manicka, Naveen, et al., "Simplify IoT Edge-to-Multi-Cloud Data Flow with Cisco Edge Intelligence", Cisco | Cisco Blogs https://blogs.cisco.com/developer/edge-intelligence-sandbox-lab, Aug. 6, 2020, pp. 1-7.
Marko, Kurt, "SAP to the fore as Cloud Foundry grows into the preferred platform for cloud-native enterprise apps", Diginomica https://diginomica.com/cloud-foundry-growing-preferred-platform-cloud-native-enterprise-applications, Jun. 19, 2017, pp. 1-10.
Mohamed, Riaz, "Deploy Cloud Agnostic Applications with VMware vRealize Automation Cloud", VMWare Cloud Management https://blogs.vmware.com/management/2019/09/cloud-agnostic-apps-vra-cloud.html, Sep. 17, 2019, pp. 1-10.
Morabito, Roberto, et al., "A Framework Based on SDN and Containers for Dynamic Service Chains on IoT Gateways", Proceedings of the Workshop on Hot Topics in Container Networking and Networked Systems. Ericsson Research, NomadicLab, Aug. 11, 2017, pp. 42-47.
Msv, Janakiram, "Google Forays Into Edge Computing With Cloud IoT Edge and TPU", Forbes https://www.forbes.com/sites/janakirammsv/2018/07/30/google-forays-into-edge-computing-through-cloud-iot-edge-and-tpu/?sh=5e68b3fc6005, Jul. 30, 2018, pp. 1-4.
Msv, Janakiram, "Why Azure Arc is a Game Changer for Microsoft", Forbes https://www.forbes.com/sites/janakirammsv/2019/11/05/why-azure-arc-is-a-game-changer-for-microsoft/?sh=373f5c854307, Nov. 5, 2019, pp. 1-10.
Nolle, Tom, "Guide to Google Anthos architecture and management", TechTarget https://www.techtarget.com/searchcloudcomputing/tip/Guide-to-Google-Anthos-architecture-and-management, Aug. 27, 2020, pp. 1-7.
Poccia, Danilo, "New—AWS IoT Greengrass Adds Container Support and Management of Data Streams at the Edge", AWS | AWS News Blog https://aws.amazon.com/blogs/aws/new-aws-iot-greengrass-adds-docker-support-and-streams-management-at-the-edge/, Nov. 25, 2019, pp. 1-7.
Stakun, Jaroslaw, "Introduction to Red Hat OpenShift Container Platform", Open Virtualization Pro https://www.openvirtualization.pro/red-hat-openshift-container-platform/, Apr. 26, 2019, pp. 1.
Wiggers, Steef-Jan, "Google Cloud Platform Release Edge TPU and Cloud IoT Edge", InfoQ https://www.infoq.com/news/2018/07/google-iot-edge-tpu-ai/, Jul. 30, 2018, pp. 1-4.
"Available Supporting Components", https://docs.openshift.com/container-platform/4.1/architecture/understanding-development.html#supporting-components retrieved May 27, 2022 relevant to OpenShift Container Platform 4.1 general availability Jun. 4, 2019, pp. 1-2.
"Comprehensive Guide on Upgrading PKS", PKS 1.3, Apr. 2019, pp. 1-45.
"Enabling Monitoring for User-defined Projects", https://docs.openshift.com/container-platform/4.6/monitoring/enabling-monitoring-for-user-defined-projects.html retrieved May 24, 2022 relevant to OpenShift Container Platform 4.6 general avaibility Oct. 27, 2020, pp. 1-13.
"How to adopt a multi-cluster strategy for your applications in Anthos", YouTube | Google Cloud Tech htps://www.youtube.com/watch?v=ZhF-rTXq-Us&list=PLlivdWyY5sqKN73vzKpg2p2JmOGoAN0CG&index=6, May 29, 2020, pp. 1.
"How to get started with Anthos on Google Cloud", YouTube | Google Cloud Tech https://www.youtube.com/watch?v=ghFiaz7juoA&list=PLlivdWyY5sqKN73vzKpg2p2JmOGoAN0CG&index=4, Apr. 30, 2020, pp. 1.
"How to Troubleshoot PKS Upgrade Issues", VMware Tanzu Supprt Hub https://community.pivotal.io/s/article/how-to-troubleshoot-pks-upgrade-issues?language=en_US, Jul. 17, 2019, pp. 1-11.
"Installation and Update OpenShift Container Platform Installation Overview", https://docs.openshift.com/container-platform/4.5/architecture/architecture-installation.html retrieved May 24th relevant to OpenShift Container Platform 4.5 general availability Jul. 13, 2020, pp. 1-17.
"Journey to OpenShift in a Multi-Cloud Environment, Part 3", RedHat Hybrid Cloud | Blog https://cloud.redhat.com/blog/journey-openshift-multi-cloud-environment-part-3, Jan. 2, 2018, pp. 1-4.
"Managing Metrics", https://docs.openshift.com/container-platform/4.6/monitoring/managing-metrics.html#managing-metrics retrieved May 24, 2022 relevant to OpenShift Container Platform 4.6 general availability Oct. 27, 2020, pp. 1-14.
"Migrating Kubernetes apps to Serverless with Cloud Run on Anthos", YouTube | Google Cloud Tech https://www.youtube.com/watch?v=0T5UliS9j8A, Nov. 19, 2019, pp.
"Monitoring Project and Application Metrics Using the Developer Perspective", https://docs.openshift.com/container-platform/4.9/applications/odc-monitoring-project-and-application-metrics-using-developer-perspective.html#monitoring-project-and-application-metrics-using-developer-perspective retrieved May 24, 2022 relevant to, OpenShift 4.9 general availability Oct. 18, 2020, pp. 1-7.
"New Technology Projection: The Total Economic Impact of Anthos", A Forrester Total Economic Impact https://services.google.com/fh/files/misc/the_total_economic_impact_of_anthos. df?mkt_tok=ODA4LUdKVy0zMTQAAAGEowKcUaDaTyTRyP0murezYOwrjB4GihzmPwbs7d0qMaMhJZtax3Of12Gx2-HRDm4SifQME2gL7297yUgZ3FEMxg5UdUp3eFaN5j_Oie7D0ta28s, Nov. 2019, pp. 1-26.
"Observing Environments", https://access.redhat.com/documentation/en-us/ed_hat_advanced_cluster_management_for_kubernetes/2.1/html-single/observing_environments/index retrieved May 24, 2022 relevant to Red Hat Advanced Cluster Management for Kubernetes 2.1, general availability Nov. 5, 2020, pp. 1-16.
"OpenShift Container Platform Architecture", https://docs.openshift.com/container-platform/4.5/architecture/architecture.html retrieved May 24, 2022 relevant to OpenShift Container Platform 4.5 general availability Jul. 13, 2020, pp. 1-10.
"OpenShift Container Platform Architecture", https://docs.openshift.com/container-platform/4.1/architecture/architecture.html retrieved May 27, 2022 relevant to OpenShift Container Platform 4.1 general availability Jun. 4, 2019, pp. 1-11.
"OpenShift Container Platform cluster monitoring, logging, and Telemetry", RedHat https://access.redhat.com/documentation/en-us/openshift_container_platform/4.2/html/container-native_virtualization/container-native-virtualization-user-s-guide#cnv-openshift-cluster-monitoring, Oct. 16, 2019, pp. 1-7.
"OpenShift Container Platform installation overview", https://docs.openshift.com/container-platform/4.1/architecture/architecture-installation.html retrieved May 27 relevant to OpenShift Container Platform 4.1 general availability Jun. 4, 2019, pp. 1-13.
"Overview: OpenShift Container Platform", https://docs.openshift.com/container-platfomn/3.9/getting_started/index.html retrieved May 24 relevant to OpenShift Container Platform 3.9 general availability Oct. 2018, pp. 1-2.
"Overview: OpenShift v3", https://docs.openshift.com/container-platform/3.9/architecture/index.html retrieved May 24, 2022 relevant to OpenShift Container Platform 3.9 general availability Oct. 2018, pp. 1-9.
"Overview: Templates", https://docs.openshift.com/container-platform/3.9/dev_guide/templates.html retrieved May 24, 2022 relevant to OpenShift Container Platform 3.9 general availability Oct. 2018, pp. 1-27.
"Pivotal CF 1.3 App Dashboard and Usage Reports", YouTube https://www.youtube.com/watch?v=jpGUbjh8IUY, Sep. 25, 2014, pp. 1.
"Pivotal Cloud Foundry Documentation", Pivotal Version 2.0 https://resources.docs.pivotal.io/pdfs/pcf-docs-2.0 pdf, Dec. 20, 2018, pp. 1-1591.
"Pivotal Container Service (PKS)", Pivotal Version 1.2 https://resources.docs pivotal.io/pdfs/pks-1-2.pdf, Sep. 3, 2019, pp. 1-323.
"Pivotal Container Service Overview", Slideshare https://www.slideshare.net/Pivotal/pivotal-container-service-overview, Jul. 16, 2019, pp. 1-78.
"Red Hat Enterprise Linux CoreOS (RHCOS)", https://docs.openshift.com/container-platform/4.1/architecture/architecture-rhcos.html retrieved

(56) References Cited

OTHER PUBLICATIONS

May 27, 2022 relevant to OpenShift Container Platform 4.1 general availability Jun. 4, 2019, pp. 1-16.
"Red Hat Enterprise Linux CoreOS (RHCOS)", https://docs.openshift.com/container-platform/4.5/architecture/architecture-rhcos.html retrieved May 24, 2022 relevant to OpenShift Container Platform 4.5 general availability Jul. 13, 2020, pp. 1-19.
"Service Catalog", https://docs.openshift.com/container-platform/3.9/architecture/service_catalog/index.html retrieved May 24, 2022 relevant to OpenShift Container Platform 3.9 general availability Oct. 2018, pp. 1-9.
"Template Service Broker", https://docs.openshift.com/container-platform/3.9/architecture/service_catalog/template_service_broker.html retrieved May 24, 2022 relevant to OpenShift Container Platform 3.9 general availability Oct. 2018, pp. 1-2.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Feb. 5, 2019, pp. 140.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Mar. 6, 2019, pp. 6-40.
"The Service Mesh Era: Architecting, Securing and Managing Microservices with Istio", Google Cloud https://services.google.com/fh/files/misc/the_service_mesh_era_architecting_securing_and_managing_microservices_with_istio_white_paper.pdf, Jan. 22, 2019, pp. 1-40.
"Understanding OpenShift Container Platform development", https://docs.openshift.com/container-platform/4.5/architecture/understanding-development.html retrieved May 24, 2022 relevant to OpenShift Container Platform 4.5 general availability Jul. 13, 2020, pp. 1-17.
"Understanding OpenShift Container Platform development", https://docs.openshift.com/container-platform/4.1/architecture/understanding-development.html retrieved May 27, 2022 relevant to OpenShift Container Platform 4.1 general availability Jun. 4, 2019, pp. 1-18.
"VMware Announces VMware Tanzu Portfolio to Transform the Way Enterprises Build, Run and Manage Software on Kubernetes", VMware News & Stories https://news.vmware.com/releases/vmware-announces-vmware-tanzu-portfolio-to-transform-the-way-enterprises-build-run-and-manage-software-on-kubernetes. Aug. 26, 2019, pp. 1-11.
"VMware Enterprise PKS Architecture Overview", YouTube https://www.youtube.com/watch?v=504FGHukY8Y, Feb. 9, 2018, pp. 1.
"VMware Tanzu Mission Control Demo", YouTube https://www.youtube.com/watch?v=7m9S4HilJlo, Aug. 28, 2019, pp. 1.
"What is Anthos Service Mesh?", Google Cloud | Anthos Service Mesh 1.4 https://cloud.google.com/service-mesh/v1.4/docs/overview, Dec. 20, 2019, pp. 1-4.
"What is Anthos?", YouTube | Google Cloud Tech https://www.youtube.com/watch?v=Qtwt7QcW4J8, Apr. 21, 2020, pp. 1.
Balkan, Ahme ALP, "What's new in Cloud Run for Anthos", Google Cloud https://cloud.google.com/blog/products/serverless/new-features-in-cloud-run-for-anthos-ga, Dec. 11, 2019, pp. 1-7.
Banka, Roank , "Pivotal CloudFoundry on Google cloud platform", Slideshare https://www.slideshare.net/Pivotal/pivotal-container-service-overview, Jul. 16, 2018, pp. 1-44.
Ben-David, Jacob , "Google Cloud's Anthos—Everything You Need to Know", Turbonomic Blog https://blog.turbonomic.com/google-clouds-anthos, Apr. 15, 2019, pp. 1-9.
Goodison, Donna, "Google Cloud Unleashes Managed Service Mesh, Serveriess for Anthos", The Channel Co. CRN https://www.crn.com/news/cloud/google-cloud-unleashes-managed-service-mesh-serverless-for-anthos, Sep. 16, 2019, pp. 1-6.
Holzle, Urs , et al., "Introducing Anthos: An entirely new platform for managing applications in today's multi-cloud world", Google Cloud https://cloud.google.com/blog/topics/hybrid-cloud/new-platform-for-managing-applications-in-todays-multi-cloud-world, Apr, 9, 2019, pp. 1-7.
Islam, Tariq , et al., "5 frequently asked questions about Google Cloud Anthos", Google Cloud https://cloud.google.com/blog/topics/hybrid-cloud/5-frequently-asked-questions-about-google-cloud-anthos, Jun. 20, 2019, pp. 1-5.
Lin, Jennifer, et al., "Anthos simplifies application modernization with managed service mesh and serveriess for your hybrid cloud", Google Cloud https://cloud.google.com/blog/topics/hybrid-cloud/anthos-simplifies-application-modernization-with-managed-service-mesh-and-serverless-for-your-hybrid-cloud, Sep. 16, 2019, pp. 1-6.
Malasi, Aman , "Google Anthos: Write Once, Run Anywhere", HCL Tech Blogs https://www.hcltech.com/blogs/google-anthos-write-once-run-anywhere, Aug. 26, 2019, pp. 1-2.
Mcluckie, Craig , "Introducing VMware Tanzu Mission Control to Bring Order to Cluster Chaos", VMware Tanzu https://tanzu.vmware.com/content/blog/introducing-vmware-tanzu-mission-control-to-bring-order-to-cluster-chaos, Aug. 26, 2019, pp. 1-6.
D'Keefe, Megan , "Welcome to the service mesh era: Introducing a new Istio blog post series", Google Cloud https://cloud.google.com/blog/products/networking/welcome-to-the-service-mesh-era-introducing-a-new-istio-blog-post-series, Jan. 22, 2019, pp. 1-5.
Reid, Nate , "Upgrading VMware Enterprise PKS 1.2 to 1.3", YouTube https://www.youtube.com/watch?v=7pAxNWlxVLM, Jan. 28, 2019, pp. 1.
Schonbaum, Iftach , "Anthos—Google's Enterprise Hybrid & Multi-Cloud Platform", CloudZone https://medium.com/cloudzone/anthos-googles-enterprise-hybrid-multi-cloud-platform-7975e05a7729, Apr. 23, 2019, pp. 1-7.
"Architecting VMware Unified Access Gateway", https://www.youtube.com/watch?v=URSdJ9qCQKo&t=234s, Apr. 17, 2019, pp. 1.
"AWS Architecture Monthly—Internet of Things Jun. 2019", AWS | https://d1.awsstatic.com/whitepapers/architecture-monthly/AWS-Architecture-Monthly-June-2019.pdf, Jun. 2019.
"AWS IoT Greengrass", https://web.archive.org/web/20190624094650/https:/aws.amazon.com/greengrass/, Jun. 2019, pp. 1-13.
"AWS IoT vs. Google IoT vs. Azure IoT", Bizety | https://www.bizety.com/2018/08/28/aws-iot-vs-google-iot-vs-azure-ot/, Aug. 28, 2018, pp. 1-7.
"Azure IoT Central intro walkthrough", https://www.youtube.com/watch?v=G32stXSwtyA&ab_channel=MicrosoftDeveloper, Feb. 2018.
"Cloud IoT Core", https://web.archive.org/web/20190129000453/https:/cloud.google.com/iot-core/, Jan. 2019, pp. 1-10.
"Cloud IoT Core—Devices, configuration, and state", Google | https://web.archive.org/web/20190330153113/https://cloud.google.com/iot/docs/concepts/devices, Mar. 2019.
"Cloud IoT Core Private Beta", Google | https://web.archive.org/web/20170518022234/https://cloud.google.com/iot-core/, May 2017.
"Comprehensive Guide on Upgrading PKS", PKS 1.3 https://kb.vmware.com/sfc/servlet.shepherd/version/download/068f4000009EfWPAA0, Apr. 2019, pp. 1-45.
"Deploying and Configuring VMware Unified Access Gateway", VMware | Unified Access Gateway 3.1 https://techzone.vmware.com/configuring-edge-services-vmware-unified-access-gateway-vmware-workspace-one-operational-tutorial#overview, Oct. 27, 2017, pp. 1-89.
"Extended offline operation with Azure IoTEdge", Microsoft | https://azure.microsoft.com/en-us/blog/extended-offline-operation-with-azure-iot-edge/, Sep. 2018.
"Extract, Transform, Load with AWS IoT Greengrass Solution Accelerator", AWS | https://aws.amazon.com/iot/solutions/etl-accelerator/, Oct. 2019, pp. 1-6.
"Google Cloud IoT Core", Google | https://www.slideshare.net/idof/google-cloud-iot-core, Sep. 2018.
"Introducing Google Cloud IoT Core: forsecurely connecting and managing IoTdevices at scale", Google Cloud | https://cloud.google.com/blog/products/gcp/introducing-google-cloud-iot-core-for-securely-connecting-and-managing-iot-devices-at-scale, May 2017.
"IoT Core device-to-device communication", Google |https://cloud.google.com/community/tutorials/iot-device-to-device, Dec. 2017.

(56) References Cited

OTHER PUBLICATIONS

"IoT Partner Quickstart", https://services.google.com/fh/files/misc/iot_partner_quickstart1.0.pdf, Nov. 15, 2018, pp. 1-13.
"Meeting at the Edge with VMware Internet of Things (IoT)", https://blogs.vmware.com/edge/files/2017/04/Meeting-at-the-Edge.pdf, Apr. 2017, pp. 1-9.
"Microsoft Azure IoT Reference Architecture", Version 2.0 Release, May 2, 2018, pp. 1-79.
"Microsoft IoT Central delivers low-code wayto build IoT solutions fast", Microsoft | https://azure.microsoft.com/en-us/blog/microsoft-iot-central-delivers-low-code-way-to-build-iot-solutions-fast/, Dec. 2017.
"Mobile Content Management", VMWare | https://www.vmware.com/content/dam/digitalmarketing/vmware/en/pdf/workspace-one/vmware-airwatch-mcm-datasheet.pdf, Dec. 2019, pp. 1-4.
"Release Notes for VMware Unified Access Gateway 3.1 and 3.1.1", https://docs.vmware.com/en/Unified-Access-Gateway/3.1/rn/unified_access_gateway-31-release-notes.html, Oct. 27, 2017, pp. 1-4.
"What is AWS IoT?", AWS | Youtube: https://www.youtube.com/watch?v=WAp6FHbhYCk&ab_channel=Amazon WebServices Timestamp 4:55/10:08, Jan. 2018.
"What is IoT Edge?", Code Project | https://www.codeproject.com/Articles/1261285/What-is-IoT-Edge, Sep. 2018, pp. 1-9.
Avram, Abel , "AWS Greengrass Runs Lambda Functions on IoT Devices", InfoQ | https://www.infoq.com/news/2017/06/aws-greengrass/, Jun. 8, 2017, pp. 1-2.
Banka, Roank , "Pivotal CloudFoundry on Google cloud platform", Slideshare https://www.slideshare.net/RonakBanka/pcfgcpgoogleioextended, Jul. 16, 2018, pp. 1-44.
Chi, Chrissie , "Enabling more device management scenarios with new features in IoT Hub", Microsoft Azure | https://azure.microsoft.com/en-us/blog/enabling-more-device-management-scenarios-with-new-features-in-iot-hub/, May 7, 2018, pp. 1-6.
Lobo, Savia , "Microsoft Azure IoT Edge is open source and generally available!", PacktHub | https://hub.packtpub.com/microsoft-azure-iot-edge-is-open-source-and-generally-available/, Jun. 29, 2018, pp. 1-2.
Msv, Janakiram , "5 Reasons Why Azure IoT Edge is Industry's Most Promising Edge Computing Platform", Forbes https://www.forbes.com/sites/janakirammsv/2018/07/01/5-reasons-why-azure-iot-edge-is-industrys-most-promising-edge-computing-platform/?sh=56b9ef223249, Jul. 2, 2018, pp. 1-5.
Msv, Janakiram , "Azure IoT Edge: A Technology Primer", TheNewsStack | https://thenewstack.io/azure-iot-edge-a-technology-primer/, Sep. 14, 2018, pp. 1-9.
Oleniczak, Kevin , "Using AWS IoT for Predictive Maintenance", AWS | https://aws.amazon.com/blogs/iot/using-aws-iot-for-predictive-maintenance/, Jun. 28, 2018, pp. 1-6.
Param, Sunil , "Google's Coral: A new product development platform with local AI", TechGig | https://content.techgig.com/technology/googles-coral-a-new-product-development-platform-with-local-ai/articleshow/69042955.cms, Apr. 26, 2019, pp. 1-18.
Rhee, Injong , "Bringing intelligence to the edge with Cloud IoT", Google Cloud | https://cloud.google.com/blog/products/gcp/bringing-intelligence-edge-cloud-iot, Jul. 25, 2018, pp. 1-7.
Vanderzyden, John , "Using AWS Greengrass to Enable IoT Edge Computing", mabl | https://www.mabl.com/blog/using-aws-greengrass-enable-iot-edge-computing, Aug. 23, 2017, pp. 1-12.
Wiggers, Kyle , "Microsoft launches Azure IoT Edge out of preview", VentureBeat | https://venturebeat.com/mobile/microsoft-launches-azure-iot-edge-out-of-preview/, Jun. 27, 2018, pp. 1-6.
Yamashita, Teppei , "Real-time data processing with IoT Core", Google Cloud | https://cloud.google.com/community/tutorials/cloud-iot-rtdp, Apr. 2018, pp. 1-19.
Zhang, Xinyi , "Create a CI/CD pipeline for your IoT Edge solution with Azure DevOps", Microsoft | https://devblogs.microsoft.com/iotdev/create-a-ci-cd-pipeline-for-your-iot-edge-solution-with-azure-devops/, Oct. 29, 2018, pp. 1-10.
"VMware Workspace One Access: Feature Walk-through", YouTube | https://www.youtube.com/watch?v=LGQRUe2vKWs, Feb. 19, 2020, pp. 1.
"vSphere With Tanzu—Networking with vSphere Distributed Switch.", YouTube | https://www.youtube.com/watch?v=0pl65Kn9AKk, Sep. 16, 2020, pp. 1.
Benson, Mark , "Technical Introduction to VMware Unified Access Gateway for Horizon Secure Remote Access", VMWare | https://blogs.vmware.com/euc/2015/09/what-is-vmware-unified-access-gateway-secure-remote-access.html, Sep. 9, 2015, pp. 8.
Colbert, Kit , "Announcing VMware vSphere with Tanzu: The Fastest Way to Get Started with Kubernetes", VMWare | https://blogs.vmware.com/vsphere/2020/09/announcing-vsphere-with-tanzu.html, Sep. 15, 2020, pp. 7.
Foley, Mike , "vSphere 7—Introduction to the vSphere Pod Service", VMWare | https://blogs.vmware.com/vsphere/2020/04/vsphere-7-vsphere-pod-service.html, Apr. 9, 2020, pp. 8.
Hagoort, Niels , "vSphere 7—A Closer Look at the VM DRS Score", VMWare | https://blogs.vmware.com/vsphere/2020/05/vsphere-7-a-closer-look-at-the-vm-drs-score.html, May 21, 2020, pp. 8.
Hagoort, Niels , "vSphere 7—Assignable Hardware", VMWare | https://blogs.vmware.com/vsphere/2020/03/vsphere-7-assignable-hardware.html, Mar. 31, 2020, pp. 7.
Hagoort, Niels , "vSphere 7—Improved DRS", VMWare | https://blogs.vmware.com/vsphere/2020/03/vsphere-7-improved-drs.html, Mar. 25, 2020, pp. 8.
Handy, Alex , "Using a Citrix ADC for the OpenShift Control Plane", Red Hat | https://cloud.redhat.com/blog/using-a-citrix-adc-for-the-openshift-control-plane, Oct. 6, 2020, pp. 5.
Iyengar, Ashok , "Analytics at the Edge", https://www.ibm.com/cloud/blog/analytics-at-the-edge, Jun. 8, 2020, pp. 1-13.
Iyengar, Ashok , "Architecting at the Edge", https://www.ibm.com/cloud/blog/architecting-at-the-edge, Oct. 21, 2019, pp. 1-14.
Iyengar, Ashok , et al., "Architectural Decisions at the Edge", https://www.ibm.com/cloud/blog/architectural-decisions-at-the-edge, Jul. 26, 2019, pp. 1-16.
Iyengar, Ashok , et al., "Automation at the Edge", https://www.ibm.com/cloud/blog/automation-at-the-edge, Feb. 18, 2017, pp. 1-13.
Iyengar, Ashok , "Cloud at the Edge", https://www.ibm.com/cloud/blog/cloud-at-the-edge, Feb. 26, 2019, pp. 1-9.
Iyengar, Ashok , "DevOps at the Edge", https://www.ibm.com/cloud/blog/devops-at-the-edge, Dec. 3, 2015, pp. 1-13.
Iyengar, Ashok , "GitOps at the Edge", https://www.ibm.com/cloud/blog/gitops-at-the-edge, Nov. 2, 2017, pp. 1-13.
Iyengar, Ashok , et al., "Models Deployed at the Edge", https://www.ibm.com/cloud/blog/models-deployed-at-the-edge, Mar. 30, 2020, pp. 1-17.
Iyengar, Ashok , "Policies at the Edge", https://www.ibm.com/cloud/blog/policies-at-the-edge, Jan. 22, 2020, pp. 1-13.
Iyengar, Ashok , et al., "Rounding Out the Edges", https://www.ibm.com/cloud/blog/rounding-out-the-edges, May 7, 2019, pp. 1-11.
Iyengar, Ashok , "Security at the Edge", https://www.ibm.com/cloud/blog/security-at-the-edge, May 12, 2020, pp. 1-17.
Lee, Brandon , "What is VMware vSphere 7 Assignable Hardware?", https://www.virtualizationhowto.com/2020/06/what-is-vmware-vsphere-7-assignable-hardware/, Jun. 25, 2020, pp. 8.
Mcconville, Anton , et al., "A brief history of Kubernetes, OpenShift, and IBM", IBM Developer Blog | https://developer.ibm.com/blogs/a-brief-history-of-red-hat-openshift/, Aug. 1, 2019, pp. 9.
Menezes, Alexandre , "Introduction to Security Contexts and SCCs", Red Hat | https://cloud.redhat.com/blog/introduction-to-security-contexts-and-sccs, Mar. 16, 2020, pp. 7.
Rosoff, Jared , "Project Pacific—Technical Overview", VMWare | https://blogs.vmware.com/vsphere/2019/08/project-pacific-technical-overview.html, Aug. 26, 2019, pp. 7.
Sahu, Aditya , "The Fast Lane for Data Transfer—Paravirtual RDMA(PVRDMA) Support for Native Endpoints.", VMWare | https://blogs.vmware.com/vsphere/2020/10/para-virtual-rdma-support-for-native-endpoints.html, Oct. 15, 2020, pp. 7.

(56) References Cited

OTHER PUBLICATIONS

Tamura, Yoshi, "GPUs as a service with Kubernetes Engine are now generally available", Google Cloud | https://cloud.google.com/blog/products/gcp/gpus-service-kubernetes-engine-are-now-generally-available, Jun. 19, 2018, pp. 5.

West, Michael, "vSphere With Tanzu—Getting Started with vDS Networking Setup", VMWare | https://blogs.vmware.com/vsphere/2020/10/vsphere-with-tanzu-the-fastest-way-to-deliver-kubernetes-on-vsphere.html, Oct. 8, 2020, pp. 8.

Wiggers, Steef-Jan, "Google Kubernetes Engine 1.10 Is Generally Available and Enterprise Ready", InfoQ | https://www.infoq.com/news/2018/06/google-kubernetes-engine-1.10-ga, Jun. 1, 2018, pp. 4.

"Cloud, Fog and Edge Computing—What's the Difference?", https://www.winsystems.com/cloud-fog-and-edge-computing-whats-the-difference/, Dec. 4, 2017, pp. 1-10.

"IoT: Understanding the shift from cloud to edge computing", https://internetofbusiness.com/shift-from-cloud-to-edge-computing/, Aug. 14, 2018, pp. 1-9.

Ai, Yuan, et al., "Edge computing technologies for Internet of Things: a primer", Digital Communications and Networks 4 | https://doi.org/10.1016/j.dcan.2017.07.001, 2018, pp. 77-86.

O'Keefe, Megan, "Edge Computing and the Cloud-Native Ecosystem", TheNewStack | https://thenewstack.io/edge-computing-and-the-cloud-native-ecosystem/, Apr. 18, 2018, pp. 1-11.

Ren, Ju, et al., "Edge Computing for the Internet of Things", IEEE Journals & Magazine | vol. 32 Issue: 1, 2008, pp. 1-6.

Zhao, Zhuoran, et al., "DeepThings: Distributed Adaptive Deep Learning Inference on Resource-Constrained IoT Edge Clusters", IEEE Transactions on Computer-Aided Design of Integrated Circuits and Systems, vol. 37, No. 11 | doi: 10.1109/TCAD.2018.2858384., Nov. 2018, pp. 2348-2359.

Angelas, "Java Heap Space vs. Stack Memory: How Java Applications Allocate Memory", stackify.com, Sep. 5, 2017, pp. 1-3.

Beltre, Angel, et al., "Enabling HPC workloads on Cloud Infrastructure using Kubernetes Container Orchestration Mechanisms", 2019 IEEE/ACM Workshop on Containers and New Orchestration Paradigms for Isolated Environments in HPC (CANOPIEHPC), 2019, pp. 11-20.

Warke, Amit, et al., "Storage Service Orchestration with Container Elasticity", 2018 IEEE 4th International Conference on Collaboration and Internet Computing DOI 10.1109/CIC.2018.00046, 2018, pp. 283-292.

\* cited by examiner

| Upgrades | 6 Total | Service Domains | Task History | | | |
|---|---|---|---|---|---|---|

☆ A new Upgrade v2.4.0 is available for your Service Domains. <u>What's New?</u>

| Download on all eligible ▼ | | | | |
|---|---|---|---|---|
| v2.4.0 (Latest) | | | | |
| v2.3.0 me ⇕ | Status ⇕ | Version ⇕ | Upgraded on ⇕ | Actions ⇕ |
| v2.2.0 ☐ -1 | ● Healthy | v2.0.0 | MM/DD/YYYY, 8:39:48 AM | Download ▼ |
| ☐ sd-2 | ● Healthy | v2.1.0 | -- | Download ▼ |
| ☐ sd-3 | ● Healthy | v2.1.0 | -- | Download ▼ |
| ☐ sd-4 | ● Healthy | v2.0.0 | MM/DD/YYYY, 2:56:54 PM | Download ▼ |
| ☐ sd-5 | ○ Disconnected | v2.0.0 | -- | View Recent History |
| ☐ sd-6 | ● Healthy | -- | -- | View Recent History |

*FIG. 7*

| Upgrades 14 Total | Service Domains | Task History | | | |
|---|---|---|---|---|---|
| Download on all eligible ▼ | | | | | ≡ Filters ⓞ |
| ☐ Service Domain Name ⬍ | Status ⬍ | Version ⬍ | Upgraded on ⬍ | Actions ⬍ | |
| ☐ sd-1 | ● Healthy | v2.0.6 | MM/DD/YYYY, 10:59:59 AM | View Recent History | ⋯ |
| ☐ sd-2 | ● Healthy | v2.0.6 | MM/DD/YYYY, 11:00:25 AM | View Recent History | ⋯ |
| ☐ sd-3 | ○ Disconnected | v1.17.0 | -- | ⊚ Upgrading v1.19.0... | |
| ☐ sd-4 | ● Healthy | v2.0.6 | MM/DD/YYYY, 11:00:17 AM | View Recent History | ⋯ |
| ☐ sd-5 | ⊙ Degraded | v2.0.4 | -- | Failed to Upgrade v2.0.6 | 2.0.5... |
| ☐ sd-1 | ● Healthy | v2.0.4 | MM/DD/YYYY, 9:23:23 AM | Download ▼ | |

FIG. 10

UPGRADE SYSTEMS FOR SERVICE DOMAINS

CROSS-REFERENCE TO RELATED APPLICATIONS

This application claims priority to Provisional Application Nos. 63/132,765, filed on Dec. 31, 2020, and 63/112,455, filed on Nov. 11, 2020. The aforementioned applications are incorporated herein by reference, in their entirety, for any purpose.

BACKGROUND

Multi-cloud platform as a service systems (PaaS) may deploy various services across multiple service domains on one or more different types of computing platforms. While large scale systems with many types of service domains may be useful in reducing downtime, providing redundancy, and scaling services, managing multiple service domains may be challenging. Particularly, managing upgrades across multiple service domains may require individually selecting service domains for upgrade, connecting with multiple service domains to download newly upgraded software, and monitoring progress of upgrades separately for multiple service domains.

Many existing upgrade processes may interleave download and upgrade phases of various layers of software stacks. As the download process may be susceptible to network connectivity and other environmental conditions, downloads may be time intensive or may fail abruptly. Where the download and upgrade phases are interleaved, the upgrade process as a whole may be susceptible to failure due to network connectivity or other environmental issues.

A failure during the upgrade phase may be difficult to handle due to the introduction of partial updates into the system. Further, downloads may take an arbitrarily long time because downloads may including downloading files from multiple locations, slowing down the upgrade process as a whole and leading to longer downtime for the service domain.

SUMMARY

Examples of non-transitory computer readable media are encoded with instructions which, when executed by one or more processors of a central computing system, cause the central computing system to connect with multiple service domains and determine that at least one service domain of the multiple service domains is eligible for upgrade. The instructions further cause the central computing system to store an upgrade package for the at least one service domain at a storage service separate from the central computing system and communicate access credentials to the storage service to the at least one service domain. The central computing system receives a communication from the at least one service domain indicative of upgrade status responsive to the at least one service domain having accessed the upgrade package at the storage service and updates a state management database based on the communication.

Examples of non-transitory computer readable media are encoded with instructions which, when executed by one or more processors of a service domain, cause the service domain to receive a communication from a cloud manager including access credentials to a storage service separate from the cloud manager, where the storage service has an upgrade package. The service domain further downloads, from the storage service, using the access credentials, selected items included in the upgrade package which are different from items located at a local memory of the service domain and communicates download status of the upgrade package to the cloud manager during download of the selected items. The service domain further upgrades a software stack of the service domain using the selected items after download of the selected items and communicates upgrade status for the service domain to the cloud manager at least in part during upgrading.

An example method of managing software upgrades at a service domain includes generating an upgrade package for a software stack executing at the service domain and storing the upgrade package for the software stack at a storage service. The service domain is identified as eligible for upgrade based on the software stack and state information about the service domain stored at the cloud manager. The cloud manager receives a command from a user to upgrade the service domain such that the software stack executing at the service domain includes software of the upgrade package. Upgrade of the service domain is initiated by providing the service domain with access credentials to the storage service, where the service domain manages upgrade by downloading at least a portion of the upgrade package from the storage service. The state information about the service domain is updated responsive to communications from the service domain to the cloud manager that upgrade on the service domain was successful.

BRIEF DESCRIPTION OF THE DRAWINGS

FIG. 7 illustrates an example user interface for initiating an upgrade across service domains according to particular embodiments.

FIG. 10 illustrates an example user interface for viewing and restarting failed downloads and upgrades across service domains according to particular embodiments.

DETAILED DESCRIPTION

In some implementations described herein, the complete upgrade process for a service domain is split into two separate phases for download and upgrade. The download phase may include downloading a release version of a software stack, including all bits and binaries used to perform the upgrade. An upgrade phase upgrades the service domain to the downloaded version of the software stack stored locally. Accordingly, the upgrade phase is not interrupted due to network conditions, as the files used for upgrade are stored locally. Further, various implementations described herein may shorten the download phase of upgrade by downloading only files that are changed from the previous upgrade and reducing the size of docker images to be downloaded to a service domain. As service domains may undergo many upgrades over time which may upgrade only some layers of the software stack, this approach allows service domains to make use of software already available locally at the service domain.

Examples of disclosed methods handle issues of scaling in both the download and upgrade phases. For example, a service domain connects to the cloud to download release file locations and update the download state. The state updates for both download and update are short calls with relatively little payload. Download of release files, however, use large amounts of bandwidth. Accordingly, downloading release files directly from a single location by multiple service domains at one time may be infeasible. Instead, the disclosed method allows the service domains to download directly from the source locations, which may be secure source locations. For example, in some implementations, service domains download directly from Amazon Web Services (AWS) S3 and AWS ECR. The cloud manager may provide temporary credentials to secure source locations to the service domains, and the service domains may then perform downloads autonomously and independently.

The service domains may also directly handle network issues, such as network outages, slow bandwidth, or high latency. A state machine at each service domain orchestrates the download and upgrade workflows independently of the download and upgrade workflows happening at other service domains. Accordingly, numerous service domains may be upgraded at once with less involvement from the cloud manager, allowing for downloads and upgrades at scale. Because the cloud manager is in communication with each of the service domains, the cloud manager may provide user interfaces allowing for upgrades at scale (e.g, upgrades to multiple service domains managed by the cloud manager).

Figure 1:
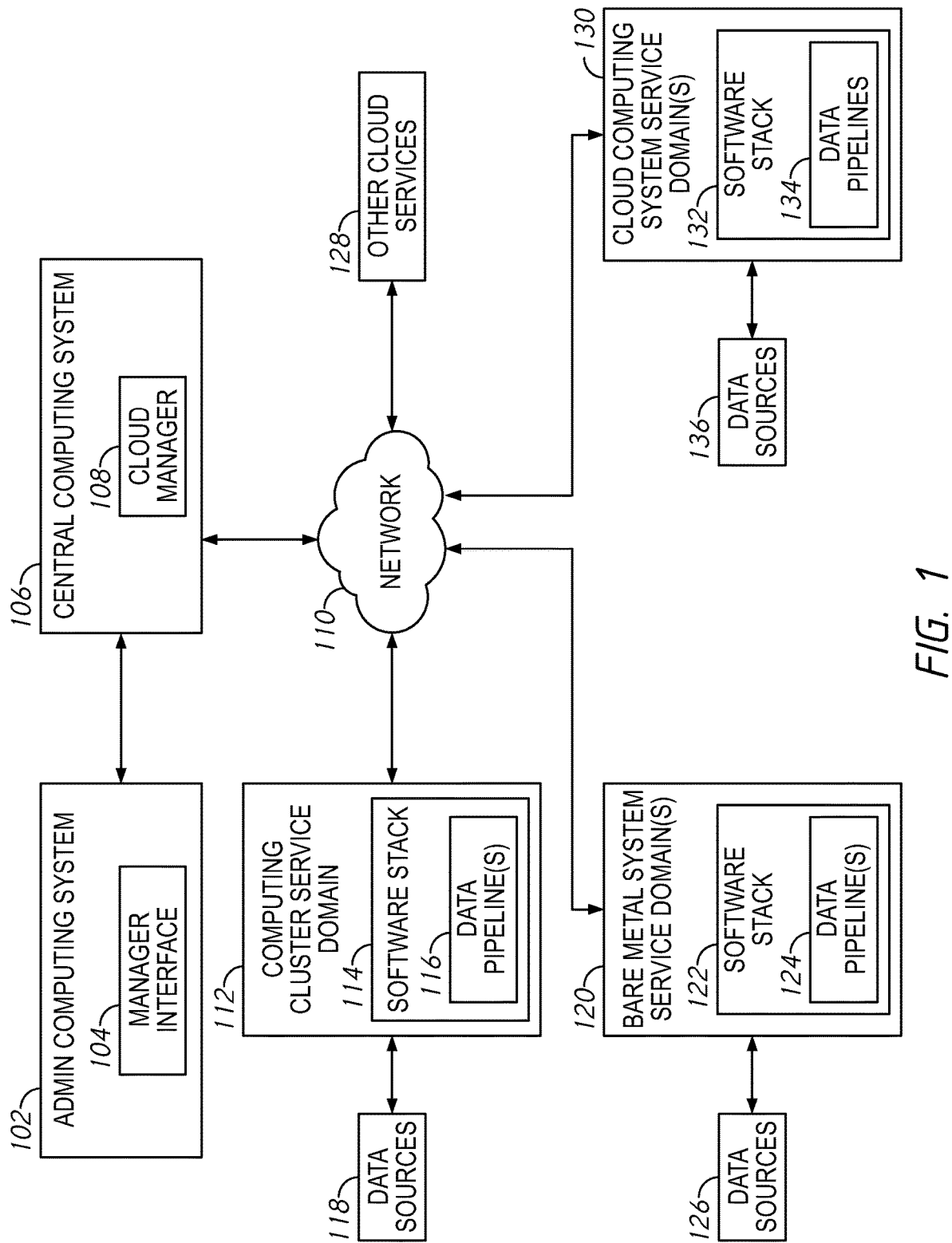
FIG. 1 is a block diagram of a multi-cloud platform as a service system according to particular embodiments.

FIG. 1 is a block diagram of a multi-cloud platform as a service system 100, in accordance with an embodiment of the present disclosure. The system may include one or more of any of computing cluster service domains 112 coupled to respective data sources 118, bare metal system service domain(s) 120 coupled to respective data sources 126, and cloud computing system service domain(s) 130 coupled to respective data sources 136. The system may further include a central computing system 106 coupled to one or more of the computing cluster service domains 112, bare metal system service domain(s) 120, and/or cloud computing system service domain(s) 130 via a network 110 to manage communication within the system.

The network 110 may include any type of network capable of routing data transmissions from one network device (e.g., of the computing cluster service domains 112, the bare metal system service domain(s) 120, the central computing system 106, and/or the cloud computing system service domain(s) 130) to another. For example, the network 110 may include a local area network (LAN), wide area network (WAN), intranet, or a combination thereof. The network 110 may include a wired network, a wireless network, or a combination thereof.

Each of the computing cluster service domains 112 may be hosted on a respective computing cluster platform having multiple computing nodes (e.g., each with one or more processor units, volatile and/or non-volatile memory, communication or networking hardware, input/output devices, or any combination thereof) and may be configured to host a respective PaaS software stack 114. Each of the bare metal system service domain(s) 120 may be hosted on a respective bare metal computing platform (e.g., each with one or more processor units, volatile and/or non-volatile memory, communication or networking hardware, input/output devices, or any combination thereof) and may be configured to host a respective PaaS software stack 122. Each of the cloud computing system service domain(s) 130 may be hosted on a respective public or private cloud computing platform (e.g., each including one or more data centers with a plurality of computing nodes or servers having processor units, volatile and/or non-volatile memory, communication or networking hardware, input/output devices, or any combination thereof) and may be configured to host a respective PaaS software stack 132. "Computing platform" as used herein may refer to any one or more of a computing cluster platform, a bare metal system platform, or a cloud computing platform. "Service domain" as used herein may refer to any of the computing cluster service domains 112, the bare metal system service domain(s) 120, or the cloud computing system service domain(s) 130. A service domain may be any computing resource running an instance of a service using the PaaS software stack. The PaaS software stacks (e.g., any of the PaaS software stack 114, the PaaS software stack 122, and/or the Paas software stack 132) may include platform-specific software configured to operate on the respective system. The software may include instructions that are stored on a computer readable medium (e.g., memory, disks, etc.) that are executable by one or more processor units (e.g., central processor units (CPUs), graphic processor units (GPUs), tensor processing units (TPUs), hardware accelerators, video processing units (VPUs), etc.) to perform functions, methods, etc., described herein. In this manner, a service domain generally refers to a one or more services which may be installed on (e.g., hosted by) a particular computing platform. The service domain may contain abstracted versions of services that any be configured as needed to run on the particular computing platform on which the service domain will be installed. In this manner, service domains may be present on any of a variety of computing platforms and nonetheless form a distributed computing system across platforms—multiple service domains may, for example, include instances of a same service which may in some examples communicate with other instances of the service across computing platforms to provide a service by the system as a whole. In some examples, centralized management of multiple (e.g., all) instances of a service may be provided, even across the varied computing platforms on which the service domains are instantiated.

The data sources 118, 126, and 136 may each include one or more devices or repositories configured to receive, store, provide, generate, etc., respective source data. The data sources may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, a data lake (e.g., a large capacity data storage system that holds raw data) or any other source of data consumed, retrieved, stored, or generated by the service domains. The service domain construct may allow a customer to deploy applications to locations proximate relevant data, in some examples. In some examples, the service domain construct may allow a customer to deploy applications to computing platforms that have a particular computing resource (e.g., hardware or software configuration) and/or based on computing resource capacity.

In some examples, various components of the system may need access to other cloud services 128. To facilitate communication with the other cloud services 128, the data pipelines of the PaaS software stacks may be configured to provide interfaces between applications hosted on one or more of the service domains 112, 120, or 130 and the other cloud services 128 via the network 110. In some examples, the data pipeline(s) 116, 124, and/or 134 hosted on any of the PaaS software stacks 114, 122, and/or 132, respectively, may be configured to provide data from the other cloud services 128 to applications hosted on one or more of the service domains 112, 120, or 130 to aggregate, transform, store, analyze, etc., the data.

Each of the PaaS software stacks may include one or more applications, data pipelines, ML models, containers, data services, etc., or any combination thereof (e.g., applications). The applications may be configured to receive, process/transform, and output data from and to other applications. The applications may be configured to process respective received data based on respective algorithms or functions to provide transformed data. At least some of the applications may be dependent on availability of supporting services to execute, such as communication services, runtime services, read-write data services, ML inference services, container management services, etc., or any combination thereof.

The data pipelines 116, 124, and/or 134 may provide a conduit through which data can be passed (e.g., provided and/or received) between applications hosted in the PaaS software stack, as well as a conduit through which data can be passed among the different service domains or to the other cloud services 128 via the network 110. Generally, a data pipeline of the data pipelines 116, 124, and/or 134 may include an input component to receive data from another data pipeline, any data source, or other service domain or other cloud services 128 (via the network 110); and at least one transform component configured to manipulate the input data to provide the output data.

The data pipelines 116, 124, and/or 134 can be constructed using computing primitives and building blocks, such as VMs, containers, processes, or any combination thereof. In some examples, the data pipelines 116, 124, and/or 134 may be constructed using a group of containers (e.g., a pod) that each perform various functions within the data pipeline (e.g., subscriber, data processor, publisher, connectors that transform data for consumption by another container within the application or pod, etc.) to consume, transform, and produce messages or data. In some examples, the definition of stages of a constructed data pipeline application may be described using a user interface or REST API, with data ingestion and movement handled by connector components built into the data pipeline. Thus, data may be passed between containers of a data pipeline using API calls.

In some examples, the PaaS software stacks may further include respective ML inference services that are configured to load and execute respective ML model applications. Thus, the ML inference services may be configured to receive a request for an inference or prediction using a ML model, and to load a ML model application that includes the requested ML model into an inference engine. The inference engine may be configured to select a runtime based on a hardware configuration of the edge system, and execute the ML model on input data to provide inference or prediction data. The inference engine may be configured to optimize the ML model for execution based on a hardware configuration. The ML inference service may provide the benefits of GPU abstraction, built-in frameworks for ML model execution, decoupling application development from hardware deployment, etc. In some examples, the cloud manager 108 may be configured to access data from the one or more data lakes, train a ML model using the transformed data, and generate an ML model application based on the trained ML model.

The one or more applications of the PaaS software stacks may be implemented using a containerized architecture that is managed via a container orchestrator. The container orchestration managed by a PaaS infrastructure and application lifecycle manager (cloud manager 108) under the service domain construct may handle (e.g., using middleware) underlying details of the PaaS related to containerized management complexity, orchestration, security, and isolation, thereby making it easier for a customer or user to focus on managing the applications. The management may be scalable via categories. In some examples, the service domains may be configured to support multi-tenant implementations, such that data is kept securely isolated between tenants. The applications communicate using application programming interface (API) calls, in some examples. In some examples, the supporting services may also be implemented in the containerized architecture.

The cloud manager 108 hosted on the central computing system 106 may be configured to centrally manage the PaaS infrastructure (e.g., including the service domains) and manage lifecycles of deployed applications. The central computing system 106 may include one or more computing nodes configured to host the cloud manager 108. The central computing system 106 may include a cloud computing system and the cloud manager 108 may be hosted in the cloud computing system and/or may be delivered/distributed using a software as a service (SaaS) model, in some examples. In some examples, the cloud manager 108 may be distributed across a cluster of nodes of the central computing system 106.

In some examples, an administrative computing system 102 may be configured to host a manager interface 104. The manager interface 104 may be configured to facilitate user or customer communication with the cloud manager 108 to control operation of the cloud manager 108. The manager interface 104 may include a graphical user interface (GUI), APIs, command line tools, etc., that are each configured to facilitate interaction between a user and the cloud manager 108. The manager interface 104 may provide an interface that allows a user to develop template applications for deployment of the service domains, identify on which service domains to deploy applications, move applications from one service domain to another, remove an application from a service domain, update an application, service domain, or PaaS software stack (e.g., add or remove available services, update deployed services, etc.).

In some examples, the cloud manager 108 may be configured to manage, for each of the computing platforms, creation and deployment of service domains, creation and deployment of application bundles to the PaaS software stacks, etc. For example, the cloud manager 108 may be configured to create and deploy service domains on one or more of the computing platforms. The computing platforms may include different hardware and software architectures that may be leveraged to create and deploy a service domain. Thus, the cloud manager 108 may be configured to manage detailed steps associated with generating a service domain in response to a received request.

The cloud manager 108 may also be configured to build and deploy different types of applications to one or more of the service domains. A user may elect to deploy an application to a type of platform based on various criteria, such as type of and/or availability of a service, proximity to source data, available computing resources (e.g., both type and available capacity), platform cost, etc., physical location of the platform, or any combination thereof.

When an application is generated, successful execution may depend on availability of various additional supporting services, such as a read/write data services (e.g., publish/subscribe service, search services, etc.), ML inference services, container management services, runtime services, etc., or any combination thereof. The cloud manager 108 may abstract deployment of the additional supporting services, as some of these may be platform-specific. Thus, a user may provide information directed to an application to be deployed to the cloud manager 108 and identify one or more target service domains, and the cloud manager 108 may deploy the application to the target service domains. The target service domains provide services to be used by the application, and accordingly, the application need not include services provided by the service domain. Moreover, the application need not take platform-specific actions which may be typically required for starting those services. The cloud manager 108 may deploy the respective application to the corresponding one of the one or more identified target service domains.

The ability of the cloud manager 108 to abstract platform-specific details for creating and deploying a service domain and creating and deploying an application or application bundle to run in a service domain may make deployment of applications to different service domains more efficient for a user, as well as may provide a customer with a wider selections of platforms than would otherwise be considered. Thus, the service domain construct may allow a customer to focus on core concerns with an application, while shifting consideration of supporting services to the cloud manager 108 and the service domains. The service domain construct may also make applications more "light weight" and modular for more efficient deployment to different service domains.

The cloud manager 108 may also be configured to monitor services and applications deployed across service domains. For example, the cloud manager 108 may monitor runtime information (e.g., memory use, I/O requests, processing use, network status, etc.) for each instance of a service deployed across multiple service domains. In some implementations, the cloud manager 108 may also monitor runtime information for applications deployed across service domains as well as general status (e.g., functioning or not functioning) of individual service domains.

The manager interface 104 may provide a GUI interface for selecting a type of application to be deployed to one or more service domains, in accordance with an embodiment of the present disclosure. The manager interface 104 may also provide a GUI interface for monitoring various services deployed across various service domains in a single view. Accordingly, the GUI interface may allow a user to view all instances of all applications associated with the user, an entity, a project, an application, etc., to effectively monitor health of service domains and applications and services deployed at the service domains.

Figure 2:
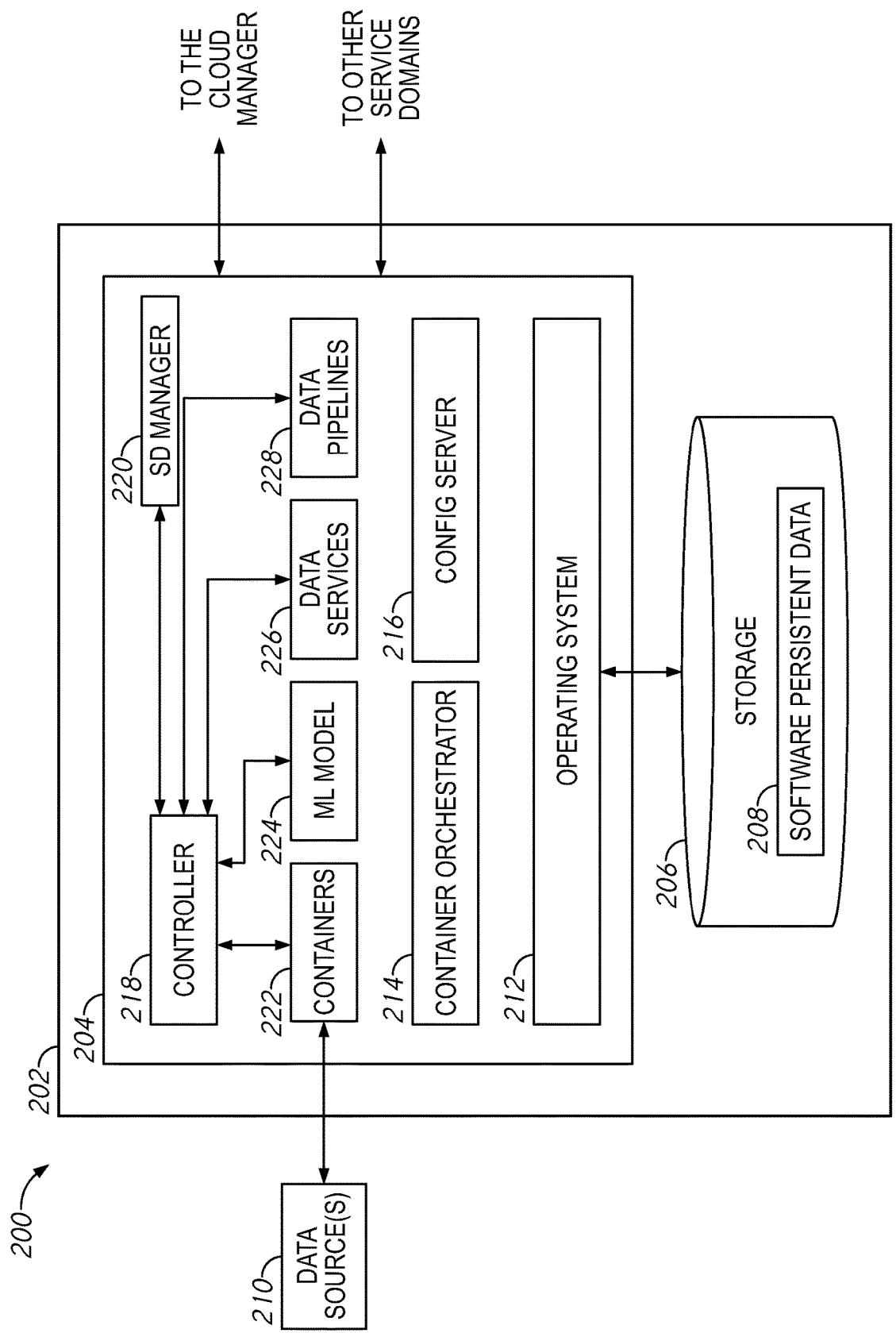
FIG. 2 is a block diagram of a service domain, according to particular embodiments.

FIG. 2 is a block diagram of a computing platform 200 in accordance with some embodiments of the present disclosure. The computing platform 200 may include a service domain 202 configured to host a PaaS software stack 204 and storage 206. The computing platform 200 may include any of a computing cluster platform, a bare metal system platform, or a cloud computing platform. Any of the computing cluster service domains 112, the bare metal system service domain(s) 120, and/or the cloud computing system service domain(s) 130 of FIG. 1 may implement a respective version of the service domain 202. Any of the PaaS software stack 114, the PaaS software stack 122, and/or PaaS software stack 132 of FIG. 1 may implement some or all of the PaaS software stack 204.

In some examples, the service domain 202 may be configured to host a respective PaaS software stack 204. In some examples, the service domain 202 may include a VM hosted on the computing platform 200.

The storage 206 may be configured to store PaaS software persistent data 208, such as software images, binaries and libraries, metadata, etc., to be used by the service domain 202 to load and execute the PaaS software stack 114. In some examples, the PaaS software persistent data 208 includes instructions that when executed by a processor of the service domain 202, causes the service domain 202 to perform functions described herein. The storage may include local storage (solid state drives (SSDs), hard disk drives (HDDs), flash or other non-volatile memory, volatile memory, or any combination thereof), cloud storage, networked storage, or any combination thereof.

The PaaS software stack 204 includes a bundle hosted on a physical layer of the service domain 202 to facilitate communication with one or more data source(s) 210, other service domains and/or computing platforms and/or a PaaS infrastructure and application lifecycle manager (e.g., the Cloud manager 108 of FIG. 1). The data source(s) 210 may include input/output devices (e.g., sensors (e.g., electrical, temperature, matter flow, movement, position, biometric data, or any other type of sensor), cameras, transducers, any type of RF receiver, or any other type of device configured to receive and/or generate source data), enterprise or custom databases, or any other source of data consumed, retrieved, stored, or generated by the service domains. The service domain 202 may communicate with one or more other service domains to, for example, form a peer-to-peer network with geographically close service domains to share downloaded software upgrades over the peer-to-peer network.

The PaaS software stack 204 may host an underlying operating system 212 configured to interface the physical layer of the service domain 202. In some examples, a controller 218, a service domain manager 220, a container orchestrator 214, and a configuration server 216 may run on the operating system 212. In some examples, the PaaS software stack 204 may include a bare metal implementation that runs the operating system 212 directly on the physical layer. In other examples, the PaaS software stack 204 may include a virtualized implementation with a hypervisor running on the physical layer and the operating system 212 running on the hypervisor.

The container orchestrator 214 may be configured to manage a containerized architecture of one or more applications (e.g., containers 222, ML models 224, data services 226, and/or data pipelines 228). In some examples, the container orchestrator 262 may include Kubernetes® container orchestration software.

The service domain manager 220 may communicate with the cloud manager 108 to receive application bundles (e.g., including applications and supporting services) for installation (e.g., including the containers 222, the ML models 224, the data services 226, and/or the data pipelines 228), data source connectivity information, etc. In some examples, the service domain manager 220 may also be configured to provide configuration and status information to the cloud manager 108, including status information associated with one or more of the data source(s) 210. For example, the service domain manager 220 may be a service at the service domain 202 that communicates with the cloud manager 108 for any changes or updates via websocket message or inventory delta sync. The service domain manager 220 may act as a proxy to the configuration server 216, which may manage the download and upgrade process.

The configuration server 216 may handle the download and upgrade process for a service domain. In the case of a multi-node service domain, there may be a master configuration server which handles the download and upgrade processes for the nodes in the service domain.

In response to information received from the PaaS manager, the service domain manager 220 may be configured to provide instructions to the controller 218 to manage the applications supported by the service domain 202, which may include causing installation or upgrading of one of the applications; removing one of the applications; starting or stopping new instances of the applications; allocating service domains to host the PaaS software stack 204; or any combination thereof. The PaaS software persistent data 208 may include application data that includes data specific to the respective application to facilitate execution, including supporting services.

As previously described, the applications may be implemented using a containerized architecture to receive source data from one or more of the data source(s) 210 (e.g., or from applications) and to provide respective transformed data at an output by applying a respective function or algorithm to the received source data. In some examples, the applications may include any user-specified or defined function or algorithm.

In some examples, the data pipelines 228 may be constructed using a group of containers (e.g., a pod) that each perform various functions within the data pipeline (e.g., subscriber, data processor, publisher, connectors that transform data for consumption by another container within the application or pod, etc.) In some examples, the definition of stages of a constructed data pipeline application may be described using a user interface or REST API, with data ingestion and movement handled by connector components built into the data pipeline. Thus, data may be passed between containers of a data pipeline 228 using API calls.

In operation, the PaaS software stack 204 hosted on the service domain 202 may control operation of the service domain 202 within an IoT or other system to facilitate communication with one or more data source(s) 210. The service domain manager 220 of the PaaS software stack 204 may communicate with the PaaS manager to receive allocation of a service domain to host the PaaS software stack 204 and receive application bundles for installation (e.g., including the containers 222, the ML models 224, the data services 226, and/or the data pipelines 228) on the PaaS software stack 204. In response to information received from the PaaS manager, the service domain manager 220 may be configured to provide instructions to the controller 218 to manage the application bundles, which may include causing installation or upgrading of one of the application bundles; removing one of the application bundles; starting or stopping new instances of the application bundles, allocating hardware resources to the PaaS software stack 204 as part of the service domain, storing data in and/or retrieving data from the PaaS software persistent data 208, or any combination thereof.

The applications may receive source data from one or more of the data source(s) 210 (e.g., or from other applications) and to provide respective transformed data at an output by applying a respective function or algorithm to the received source data. In some examples, the respective algorithms or functions may include machine learning (ML) or artificial intelligence (AI) algorithms. In some examples, the applications may cause the received and/or processed source data to be provided to other service domains via the configuration server 216. In some examples, the applications may be implemented using a containerized architecture deployed and managed by the container orchestrator 214. Thus, the container orchestrator 214 may deploy, start, stop, and manage communication with the applications within the PaaS software stack 204.

Figure 3:
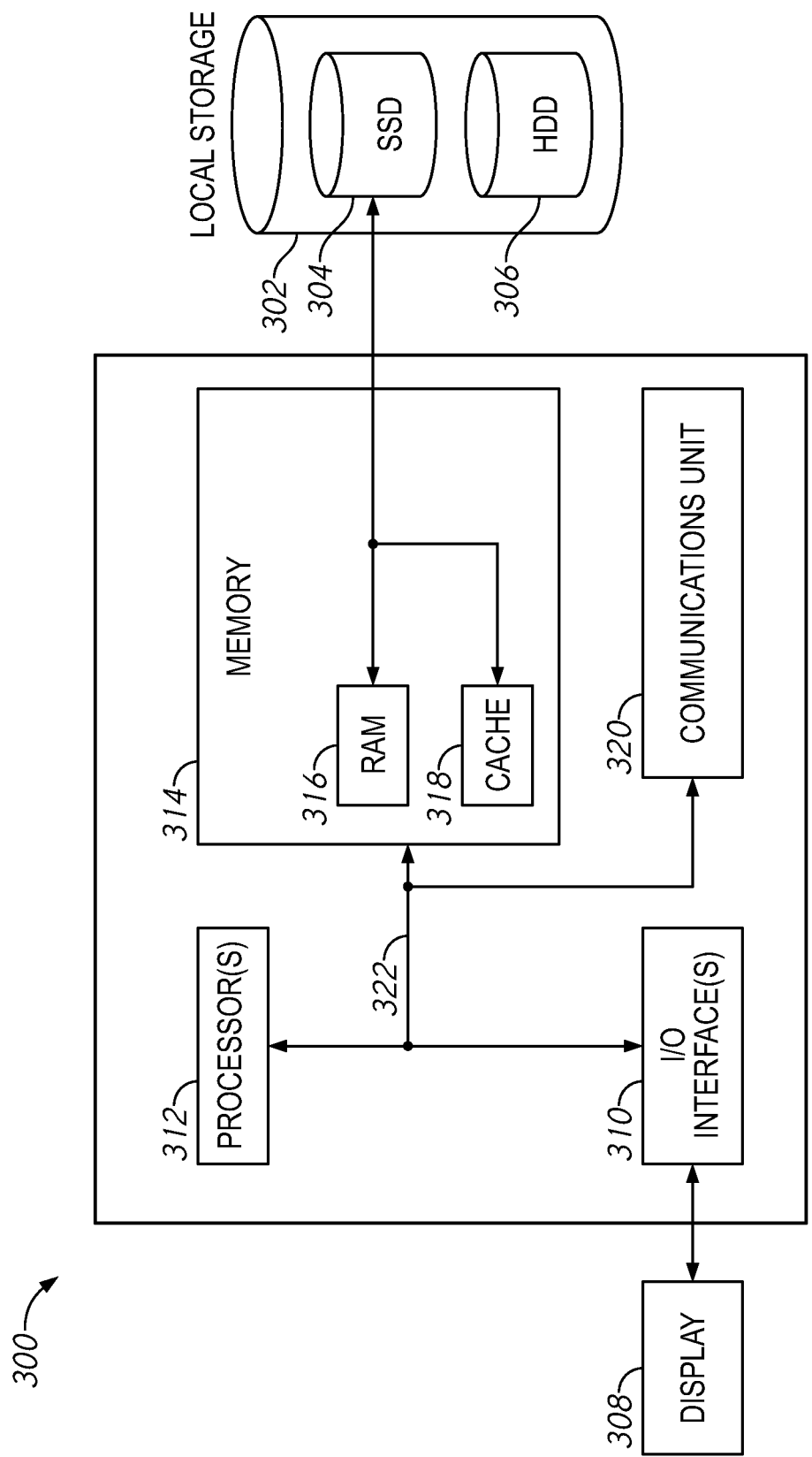
FIG. 3 is a block diagram of components of a computing node according to particular embodiments.

FIG. 3 is a block diagram of a computing system 300, in accordance with an embodiment of the present disclosure. The computing system 300 may be implemented as part of a cluster of computing nodes forming the computing cluster, the bare metal computing platform, or the cloud computing platform described with reference to FIG. 1 configured to host the described service domains. The computing system 300 may also be used to implement other components of the multi cloud platform as a service system, such as the central computing system 106 or the administrative computing system 102.

The computing system 300 includes a communications fabric 322, which provides communication between one or more processor(s) 312, memory 314, local storage 302, communications unit 320, and I/o interface(s) 310. The communications fabric 322 can be implemented with any architecture designed for passing data and/or control information between processors (such as microprocessors, communications and network processors, etc.), system memory, peripheral devices, and any other hardware components within a system. For example, the communications fabric 322 can be implemented with one or more buses.

The memory 314 and the local storage 302 are computer-readable storage media. In this embodiment, the memory 314 includes random access memory Ram 316 and cache 318. In general, the memory 314 can include any suitable volatile or non-volatile computer-readable storage media. In an embodiment, the local storage 302 includes an SSD 304 and an HDD 306.

Various computer instructions, programs, files, images, etc., may be stored in local storage 302 for execution by one or more of the respective processor(s) 312 via one or more memories of memory 314. In some examples, local storage 302 includes a magnetic HDD 306. Alternatively, or in addition to a magnetic hard disk drive, local storage 302 can include the SSD 304, a semiconductor storage device, a read-only memory (ROM), an erasable programmable read-only memory (EPROM), a flash memory, or any other computer-readable storage media that is capable of storing program instructions or digital information.

The media used by local storage 302 may also be removable. For example, a removable hard drive may be used for local storage 302. Other examples include optical and magnetic disks, thumb drives, and smart cards that are inserted into a drive for transfer onto another computer-readable storage medium that is also part of local storage 302.

Communications unit 320, in some examples, provides for communications with other data processing systems or devices. In these examples, communications unit 320 includes one or more network interface cards. Communications unit 320 may provide communications through the use of either or both physical and wireless communications links.

I/o interface(s) 310 allow for input and output of data with other devices that may be connected to a computing system 300. For example, I/o interface(s) 310 may provide a connection to external devices such as a keyboard, a keypad, a touch screen, and/or some other suitable input device. External devices can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 302 via I/o interface(s) 310. I/o interface(s) 310 may also connect to a display 308.

Display 308 provides a mechanism to display data to a user may be, for example, a computer monitor. In some examples, a GUI associated with the manager interface 104 may be presented on the display 308.

Figure 4:
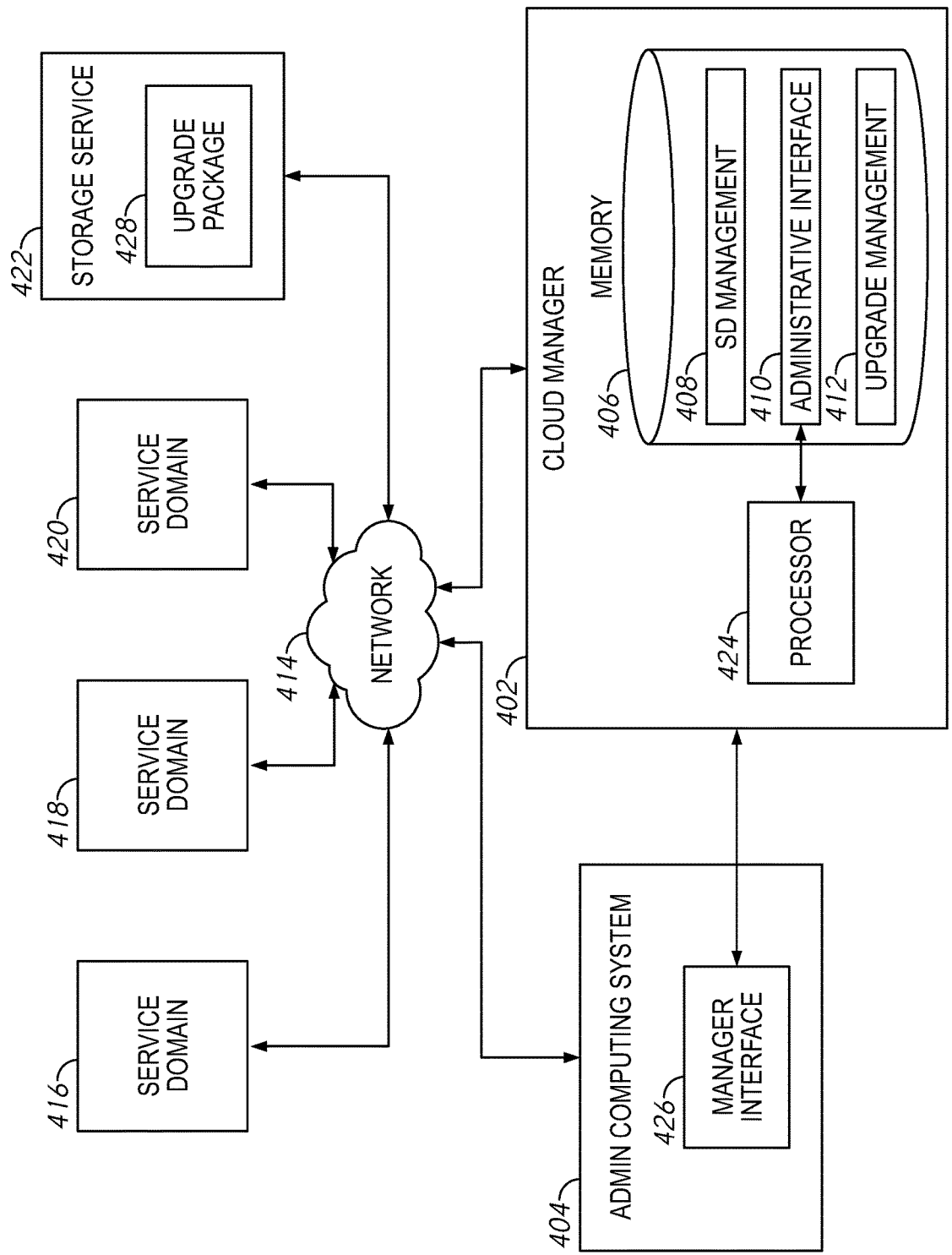
FIG. 4 is a block diagram of a multi-cloud platform as a service system, according to particular embodiments.

FIG. 4 shows a block diagram of an example multi-cloud platform as a service system, in accordance with an embodiment of the present disclosure. A cloud manager 402 including memory 406 and at least one processor 424 communicates with service domains 416, 418, and 420 through a network 414. The cloud manager 402 also communicates with an administrative computing system 404, including a manager interface 426. A storage service 422 including an upgrade package 428 may be accessible by the cloud manager 402 and the service domains 416, 418, and 420 through the network 414.

Administrative computing system 404 may be implemented by a computing system (e.g., the computing system 300) and may provide a manager interface 426 (e.g., at the display 308 of the computing system 300). The administrative computing system 404 may be implemented using any hardware or methods described with respect to the administrative computing system 102 and may perform any functions described with respect to the administrative computing system 102. The manager interface 426 may, in some implementations, provide user interfaces for managing upgrades for service domains in communication with or managed by the cloud manager 402. The manager interface 426 may be implemented using any hardware or methods described with respect to the manager interface 104 and may perform any functions described with respect to the manager interface 104.

The cloud manager 402 may be implemented by any implementations discussed with respect to the cloud manager 108 and may be implemented by a computing system 300. Further, the cloud manager 402 may perform any functions or operations described with respect to the cloud manager 108. The memory 406 of the cloud manager 402 may store instructions for service domain management 408, an administrative interface 410, and upgrade management 412. The instructions for service domain management 408, the administrative interface 410, and upgrade management 412 may communicate or interact to manage upgrades of service domains.

Service domain management 408 may include metadata, information, and state information for service domains 416, 418, and 420 managed by the cloud manager 402. In some examples, service domain management 408 may include a state management database for the service domains 416, 418, and 420 managed by the cloud manager 402. An example state management database may include entries for each service domain managed by the cloud manager 402 and fields including upgrade state, the time the upgrade state was last updated, estimated time remaining, the version of software executing on the service domain, progress, reason for failure, software version being downloaded, services in use at the service domain, or other information about the service domain.

In some implementations, service domain management 408 may include a separate database or other data structure storing information about service domains managed by the cloud manager 402 separate from the state management database. For example, a separate database may include additional information such as software deployed and running at service domains, service domain type (e.g., cloud computing service domain, computing cluster service domain, or bare metal system service domain), computing resources in use or available at service domains, and other information and metadata regarding service domains 416, 418, and 420.

The service domain management 408 may further include instructions for updating information about service domains, communicating with service domains, configuring new service domains, assessing health of service domains, or other processes for managing service domains. In some examples, service domain management 408 may implement a state management algorithm to track download and upgrade status reported by the service domains 416, 418, and 420. Service domain management 408 may further communicate with the administrative interface 410 and upgrade management 412 to manage upgrades for service domains 416, 418, and 420.

The administrative interface 410 may include instructions for generating user interfaces for display at the manager interface 426 of the administrative computing system 404. The administrative interface 410 may be implemented by instructions for communicating with service domain management 408 and upgrade management 412 to retrieve information to be displayed at the manager interface 426 responsive to, in some examples, requests from the administrative computing system 404. For example, API requests may be sent to the administrative interface 410 to, for example, show the latest versions of software, show changes between versions of software, show a list of service domains, or to show progress for initiated downloads.

The administrative interface 410 may also include instructions for receiving inputs from the manager interface 426 and passing information from the inputs to other components of the cloud manager 402. For example, the administrative interface 410 may receive a selection of service domains to upgrade and my provide the selection of service domains to service domain management 408.

Upgrade management 412 may include instructions to generate an upgrade package 428 for software stacks to be installed at service domains 416, 418, and 420 in communication with (e.g., managed by) the cloud manager 402. Upgrade management 412 may include instructions for determining dependencies between layers of software in the software stack and evaluating new versions of software in the software stack to ensure that the new versions, if included in the upgrade package 428 will not cause errors due to incompatibility with other layers of the software stack.

Storage service 422 may, in various implementations, include multiple locations and various types of storage services. For example, in some implementations, storage service 422 may be implemented with a container registry and a repository, which may be accessed separately by different access credentials. The storage service 422 may include open source or public registries or repositories and/or private registries or repositories. In some implementations, the storage service 422 may include multiple registries or multiple repositories, where different registries or repositories include components for various portions of the software stack such as docker container images, service container images, binaries, artifacts, and other components used to upgrade a service domain.

One or more of the components of the storage service 422 may be co-located with one or more of the service domains. For example, a container registry including service container images may be located at a private cloud or on premises computer cluster also hosting one of the service domains. In some examples, each component of the storage service 422 may be located separately from the cloud manager 402 and the service domains 416, 418, and 420 managed by the cloud manager 402. For example, various repositories and registries included in the storage service 422 may be located at a private cloud or on premises computer cluster that is different from a private cloud or on premises computer cluster hosting one of the service domains.

Generally, some repository of the storage service 422 includes an upgrade package 428. The upgrade package 428 may also be referred to as an upgrade bundle, upgrade directory, PaaS bundle, etc. The upgrade package 428 may be a directory, tar-ball file, or list of components included in the software stack. In some implementations, the upgrade package 428 may include pointers to docker images (e.g., information for retrieving docker images from a docker registry), service images, tar-ball files, and/or other downloadable software components for various layers of the software stack. In various implementations, the upgrade package 428 may include binaries and/or yaml files for each layer in the software stack.

The upgrade package 428 may, in some implementations, include upgrades to a subset of layers in the PaaS software stack 204 of a service domain 202, such as updates to the operating system 212, docker runtime, container orchestrator 214, and/or container services of the service domain 202. In some implementations, the upgrade package 428 directory may include download information for every layer of the PaaS software stack 204. Accordingly, the upgrade package 428 may be used to upgrade existing service domains as well as to deploy new service domains. In these implementations, the service domain 202 may download or retrieve only components not already present at a local memory of the service domain 202, such that a service domain 202 that is already deployed may not have to download the entire PaaS software stack 204 for each upgrade to a component of the PaaS software stack 204.

Service domains 416, 418, and 420 may be implemented by any type of service domain, such as a bare metal system service domain, a computing cluster service domain, and/or a cloud computing system service domain. The service domains 416, 418, and 420 may be implemented to include the components described with respect to the service domain 202. Further, while the system of FIG. 4 is shown with three service domains, other implementations may include other numbers of service domains and may further include several clusters of service domains.

Network 414 may include any type of network capable of routing data transmissions from one network device to another. For example, the network 414 may include a local area network (LAN), wide area network (WAN), intranet, or a combination thereof. The network 414 may include a wired network, a wireless network, or a combination thereof.

Figure 5:
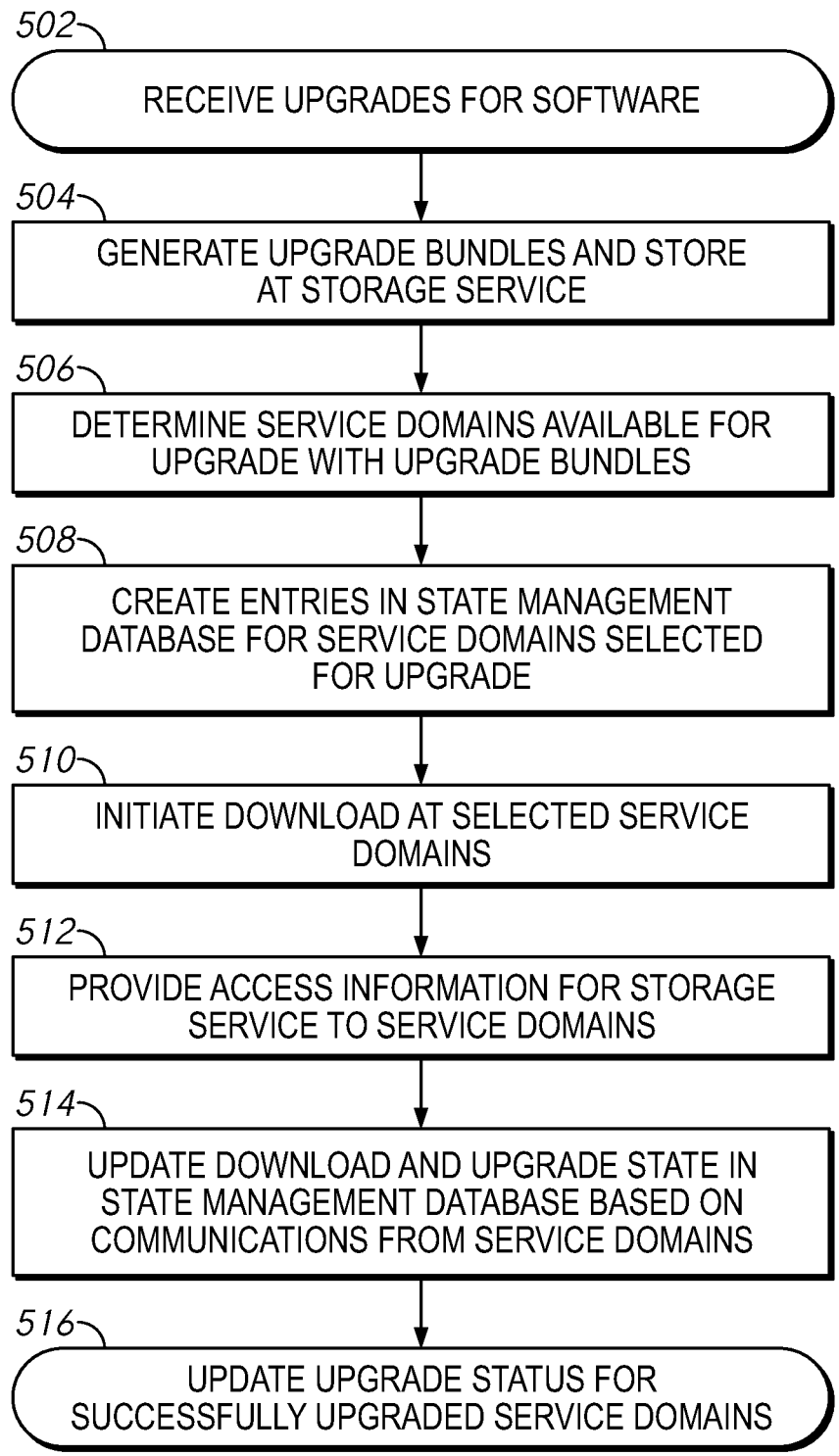
FIG. 5 is a flow chart illustrating a routine for managing upgrades across service domains according to particular embodiments.

FIG. 5 illustrates a routine 500 for managing upgrades of service domains. At block 502, the cloud manager 402 may receive upgrades for software, beginning the routine 500. The received upgrades may be, for example, upgrades to one or more layers of the software stack (e.g., new software releases).

When the cloud manager 402 receives software upgrades, the cloud manager 402 may generate upgrade packages (e.g., upgrade package 428) and store upgrade packages at a storage service (e.g., storage service 422). The upgrade packages may be generated by the cloud manager 402 to ensure compatibility between the layers of software in the software stack. For example, where two layers of the software stack communicate to perform some functions, the upgrade package 428 may not include a new version of one of the two layers where the new version would alter or prohibit communication between the new layers. The upgrade management 412 may, for example, access changes implemented by the new versions of each layer to be included in the software stack and create an upgrade package 428 including compatible versions of each layer of software in the software stack.

After generating the upgrade package 428, the cloud manager 402 may communicate with the administrative computing system 404 to display the latest version available for upgrade on the manager interface 426. For example, the administrative interface 410 may generate a user interface displaying the upgrade package 428 version number, layers updated in the upgrade package 428, and other information about the upgrade package 428.

At block 506, the cloud manager 402 may determine service domains eligible for upgrade using the upgrade package. In some implementations, the cloud manager 402 may determine service domains eligible for upgrade based on the state information of the service domains. For example, service domains not undergoing an active upgrade process may be eligible for upgrade. In some implementations, the cloud manager 402 may use other information about the service domains and applications executing at the service domains to determine which service domains are eligible for upgrade. For example, service domains may be associated with a security level (e.g., low, medium, or high), and upgrade of a layer of the software stack may be unsuitable for high security level service domains. In some instances, applications executing at service domains may be incompatible with one or more elements of an upgrade package 428.

In some implementations, after determining which service domains are eligible for upgrade, the cloud manager 402 may communicate with the administrative computing system 404 to display service domains eligible for upgrade and/or to receive a selection of service domains to upgrade using the upgrade package 428. For example, the administrative interface 410 may generate a user interface displaying service domains managed by the cloud manager 402 and which of those service domains are eligible for upgrade using the upgrade package 428. A user may, through the administrative interface 410, select which service domains to upgrade.

At block 508, the cloud manager 402 creates entries in a state management database for service domains selected for upgrade. In some implementations, before creating the entries, service domain management 408 may check that the selected service domains are neither in a state indicating active download or a state indicating active upgrade. For example, service domain management 408 may include state information for each service domain including the states of the service domains.

The cloud manager 402 may update an existing state management database (e.g., a state management database including information for all service domains managed by the cloud manager 402) or may create a new state management database specifically to track the update to the upgrade package 428 at the selected service domains, which may be referred to as a bath. State management databases may include fields for service domain ID, upgrade version, service domain type, creation time of the service domain, update time of the service domain, batch ID, upgrade progress, time remaining, time of last state upload, or other information relevant to the state of the service domain.

The cloud manager 402 initiates download at the selected service domains at block 510. In some implementations, initiating download at the selected service domains may include sending instructions (e.g., an API call or other communication) to the selected service domains including at least a version number of the upgrade software stack and a command to download. After initiating download, service domain management 408 of the cloud manager 402 may update a state information for the selected service domains reflecting the download command. For example, where service domain management 408 includes a state management database, entries in the state management database for the selected service domains may updated to reflect a state of "DOWNLOAD."

At block 512, the cloud manager 402 provides access information (e.g., access credentials) for the storage service to the selected service domains. The access credentials may include, for example, path, access key ID, token, or other types of access information for one or more locations of the storage service 422. Access credentials may be provided for, for example, repositories, docker registries, service container registries, or other locations. In some implementations, where one or more locations of the storage service 422 are open source repositories, the access credentials may include connection information to access the open source repository without keys, passwords, tokens, or other security credentials.

The cloud manager 402 updates download and upgrade states in the state management database, or other state management structure, based on communications from the selected service domains. In some implementations, before updating the state management information, the cloud manager 402 may check to ensure that the state reported by a service domain is valid for the current state the service domain has in the database. For example, a "DOWNLOADED" state may be invalid when reported by a service domain having a current state of "DOWNLOAD_CANCELLED," indicating that the state may have been reported in error. Where the state reported by the service domain is valid for the current state the service domain has in the database, the state can be updated to the reported state. In some implementations, the cloud manager 402 may receive updates from the service domains including, for example, batch ID, version, state, progress, estimated time remaining, and timestamp.

During the download phase, the administrative interface 410 may communicate with the manager interface 426 to provide an interface allowing for cancellation of the download at one or more service domains. When such a request is received by the cloud manager 402, service domain management 408 may update state information (e.g., the state management database) to reflect that the download has been cancelled. The cloud manager 402 may further send a message to the affected service domains instructing the service domains to stop the download process.

At block 516, the cloud manager 402 updates upgrade status for successfully upgraded service domains. When each of the service domains in a particular upgrade batch have successfully upgraded (e.g., the service domains are all running the software stack of the upgrade), the cloud manager 402 may update a status or state of the batch. In some implementations, service domain management 408 may delete or remove the state management database using during the batch upgrade and move the state information for the updated service domains to another location, such as a comprehensive database of all service domains managed by the cloud manager 402.

Figure 6:
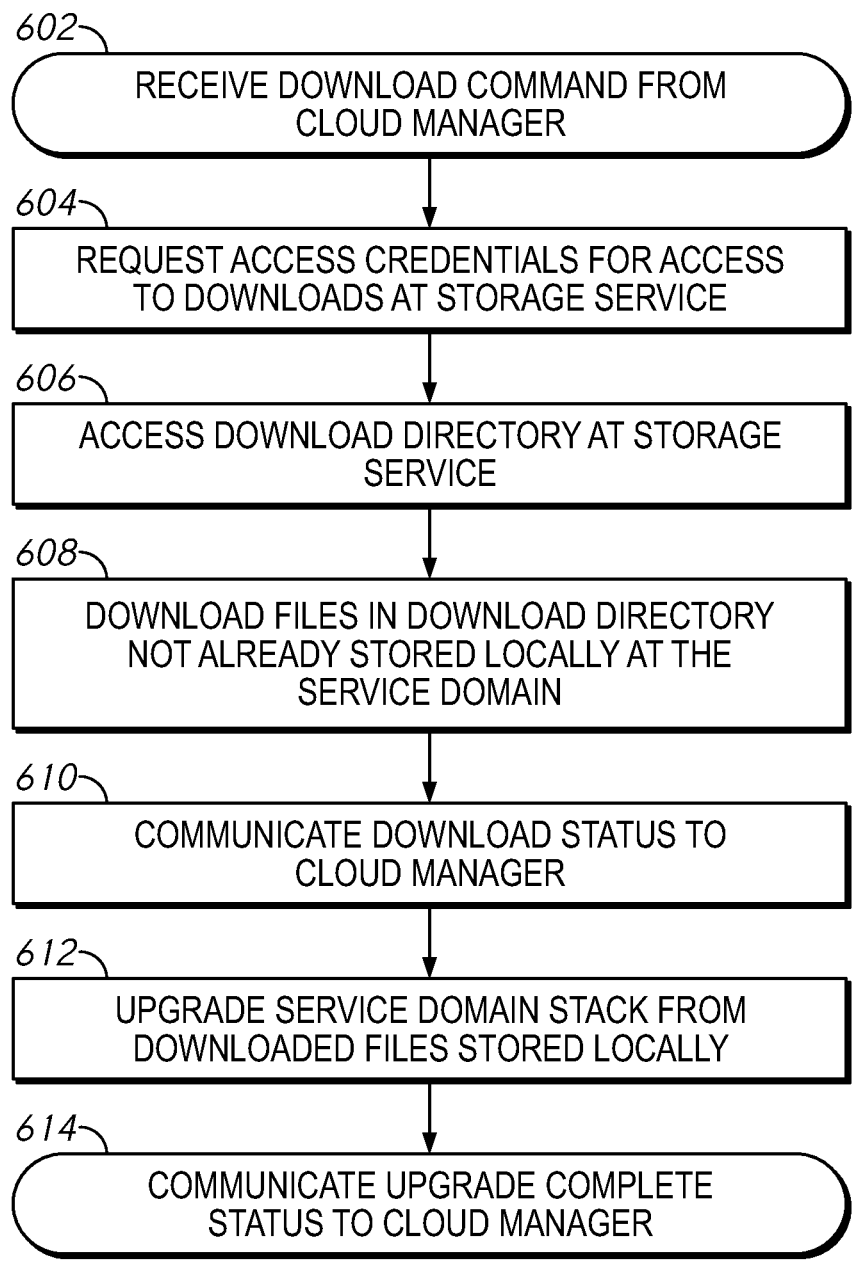
FIG. 6 is a flow chart illustrating a routine for upgrading a service domain according to particular embodiments.

FIG. 6 illustrates a routine 600 for upgrading a service domain. Though the routine 600 is described with respect to the service domain 416, the routine 600 may be used by any service domain to implement upgrades from a cloud manager as described throughout the disclosure.

At block 602, a service domain (e.g., service domain 416) receives a download command from the cloud manager 402. A download command may include a version number or other version indicator and a command to download a upgrade package (e.g., upgrade package 428) corresponding to the version number. The service domain 416 may receive the download command as a websocket message. In some implementations, the service domain 416 may regularly sync up with the cloud manager 402 for any changes (e.g., a delta inventory sync) and may receive the download command upon syncing to the cloud manager 402. In some implementations, the download command may be directly communicated to the service domain 416.

In some implementations, geographically close service domains (e.g., service domains located in the same data center) may, when selected to receive a software upgrade, form a peer-to-peer network to further streamline the download phase. For example, upon receipt of the download command, geographically close service domains may select one service domain to request access credentials and download the upgrade package. The other geographically close service domains may then communicate (e.g., via a WAN) to obtain the upgrade package from the selected service domain.

The service domain 416 requests access credentials for access to downloads at the storage service at block 604. The service domain 416 may make the request as a REST API request to the cloud manager 402. In some implementations where the service domain 416 includes multiple computing nodes, each node may make a separate request or a leader node may make the request and perform download operations on behalf of all nodes in the cluster. The service domain 416 may, in some implementations request multiple types of login credentials in one request or as multiple requests. For example, the service domain 416 may send a request for login credentials to a repository of the storage service 422 to access release files and a request for login credentials for a docker registry of the storage service 422. The service domain 416 may also initially request access credentials for a repository of the storage service 422 including the download directory and may make additional requests for access credentials responsive to determining that the service domain 416 requires access to other locations to download items in the upgrade package 428.

The request for access credentials may include information such as the batch ID of the upgrade, the service domain ID, version number, access type (e.g., requesting access to a docker registry or a repository). The cloud manager 402 may respond to the request with access credentials, which may include, for example, path, access key ID, token, or other types of access information. The service domain 416 uses the access credentials to access a download directory at the storage service at block 606.

At block 608, the service domain 416 downloads selected files in the download directory, where the selected files are not already stored locally at the service domain. The configuration server 216 may receive a download instruction from the service domain manager 220 of the service domain. Before beginning download, the configuration server 216 may perform pre-checks of the service domain to ensure that the service domain has enough space (memory) for the download and the existing network bandwidth is enough to complete the download. In some implementations, the configuration server 216 may also schedule download based on typical use or available bandwidth of the service domain.

In some implementations, the service domain 416 may also download additional files in the download directory on behalf of geographically close service domains. In these implementations, the service domain 416 may communicate with the geographically close service domains to determine which additional files the service domain 416 should download on behalf of the geographically close service domains.

The configuration server 216 may also create a folder structure prior to download of the selected files. The configuration server 216 may, for example, clone an existing release folder into a new release folder and sync the new release folder with the cloud manager 402 for any changes. Checksums of files in the new release folder may be checked against tags of files in storage service 422, such that a partial download may be resumed. The configuration server 216 may also keep the existing release folder intact in case the service domain 416 needs to be rolled back.

The service domain 416 communicates download status to the cloud manager 402 at block 610. In some implementations, the service domain 416 may report download status to the cloud manager 402 using API calls. The communications may include a batchID, which may, for example, be generated by the cloud manager 402 to track a download instance. States communicated to the cloud manager 402 may include a state for active download (e.g., "DOWNLOADING"), a state for cancellation of the download (e.g., "DOWNLOAD_CANCEL"), a state for failure of the download (e.g., "DOWNLOAD_FAILED"), a state for completion of the download (e.g., "DOWNLOADED"), and other states reflecting download status at the service domain 416.

The download process may be executed on all nodes in a cluster. For example each node in the cluster may have a configuration server 216 managing download for that node. In some implementations, download for a multi-node cluster can be bundled such that a master configuration server at a designated node manages download for other nodes in the cluster. For example, where the nodes of a cluster are connected using a local area network, the upgrade package 428 may be downloaded to the designated node and may be provided to other nodes in the cluster using a hub and spoke download pattern from the designated node.

The service domain 416 may communicate the download status to the cloud manager 402 continuously (at predetermined intervals), upon a state change, or both. Further, the service domain 416 may, in various implementations, report download progress to the service domain 416 during download. Download progress may be quantified by, for example, percentage of files downloaded or estimated time remaining in the download. In some implementations, the payloads reported by the service domain 416 to the cloud manager 402 may include batch ID, version, state, progress, estimated time remaining, and a timestamp.

At block 612, the service domain 416 upgrades the service domain stack (e.g., the software stack or PaaS software stack) from the downloaded files stored locally. The upgrade operation may be triggered by complete download of all items in the upgrade package 428 (or all selected items not already stored at the service domain 416). For service domains including multiple computing nodes, the upgrade operation may be triggered by a successful download state at each of the computing nodes in the cluster.

The service domain 416 communicates an upgrade complete status to the cloud manager 402 at block 614. Similar to communication of download status at block 610, the service domain 416 may report upgrade status to the service domain 416 using API calls and may report upgrade status continuously, upon a state change, or both. States communicated to the cloud manager 402 may include a state for upgrade triggered (e.g., "UPGRADE"), upgrade scheduled (e.g., "UPGRADE SCHEDULED"), a state for active upgrade (e.g., "UPGRADING"), a state for upgrade failure (e.g., "UPGRADE FAILED"), a state for completion of upgrade (e.g., UPGRADED), and other states reflecting upgrade status at the service domain 416. Further, the service domain 416 may, in various implementations, report upgrade progress to the cloud manager 402.

On failure of the upgrade phase, the configuration server 216 may perform rollback operations. For example, the configuration server 216 may rollback to its previous version on all nodes in the cluster along with its dependent shell scripts. Other services on various nodes may also rollback to their previous versions on failure.

FIG. 7 illustrates an example user interface 700 for initiating an upgrade across service domains according to particular embodiments. The user interface 700 may be displayed by the manager interface 426 of the administrative computing system 404 in some examples. The user interface 700 shows example service domains managed by a cloud manager (e.g., cloud manager 402) along with a health status of the service domains, software versions currently running at the service domains, a time stamp of the most recent upgrade of the service domains, and allowable actions for the service domains, dependent on their status. Further, the user interface 700 provides a menu 702 for initiating upgrade (or downgrade) to a particular version across all eligible service domains. Where a user selects the option to, for example, upgrade to the latest version on all eligible service domains, the command may be received by the administrative interface 410 of the cloud manager 402 and trigger upgrade of the selected service domains by the cloud manager 402. The user interface 700 further includes a banner 704 alerting the user that a new version of the software stack is available. The banner 704 may, in some implementations, be displayed responsive to the cloud manager 402 generating an upgrade package 428.

Figure 8:
FIG. 8 illustrates an example user interface for viewing progress of upgrades across service domains according to particular embodiments.

FIG. 8 illustrates an example user interface 800 for viewing progress of downloads across service domains according to particular embodiments. The user interface 800 may be displayed by the manager interface 426 of the administrative computing system 404 in some examples. The user interface 800 provides upgrade process of various service domains upgrading to a particular version of the software stack. In some implementations, the user interface 800 may display progress for all service domains included in an upgrade batch. The user interface 800 may show status bars 802 for each service domain displayed. The status bars 802 may be provided by the administrative interface 410 based on information provided to the cloud manager 402 by the service domains during download and upgrade. The status bars 802 may show percentage completion based on time, percentage of total file size downloaded, or other indicators of progression. While the user interface 800 shows status of downloads, similar user interfaces may be provided showing progress of the upgrade phase or of the upgrade process as a whole across the service domains.

Figures 9A, 9B:
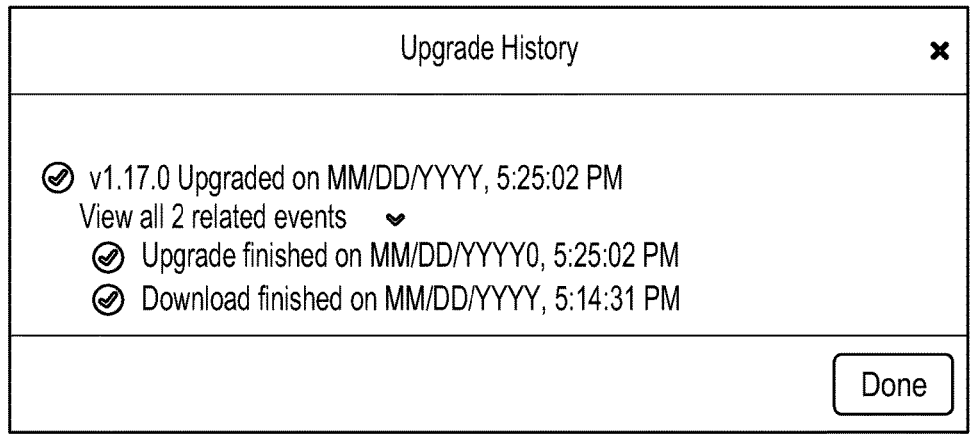
FIG. 9A illustrates an example user interface for viewing upgrade history of a service domain according to particular embodiments.
FIG. 9B illustrates an example user interface for viewing upgrade history of multiple service domains according to particular embodiments.

FIG. 9A illustrates an example user interface 900a for viewing upgrade history of a service domain according to particular embodiments. The user interface 900a may be displayed by the manager interface 426 of the administrative computing system 404 in some examples. The information displayed by the user interface 900a may be, in some examples, accessed at a state management database including times of various state transitions. For example, the time stamp for downloaded may reflect the time when the service domain reported a transition to a downloaded or download complete state to the cloud manager 402. Similarly, the upgrade complete time stamp may reflect the time when the service domain reported a transition to an upgraded state to the cloud manager 402. For some service domains, upgrade history may include additional events, such as cancellation of download, rollback to previous versions, or downloads or upgrades scheduled for a future time.

FIG. 9B illustrates an example user interface 900b for viewing upgrade history of multiple service domains according to particular embodiments. The user interface 900b may be displayed by the manager interface 426 of the administrative computing system 404 in some examples. The user interface 900b shows an update history for a grouping of service domains, including completion times for downloads and upgrades of various service domains. The information displayed at the user interface 900b may be, as described herein, derived from state transition timestamps stored at a state management database or other location of the cloud manager 402. Further, in some implementations, the user interface 900b may show additional events, including downloads and upgrades scheduled in the future.

FIG. 10 illustrates an example user interface 1000 for viewing and restarting failed downloads and upgrades across service domains according to particular embodiments. The user interface 1000 may be displayed by the manager interface 426 of the administrative computing system 404 in some examples. The user interface 1000 may provide a holistic view of upgrades across multiple service domains including versions, download status, and upgrade status. Further the user interface 1000 may provide a warning 1002 upon a failed download or upgrade to alert the user to a problem during the upgrade process. In some implementations, the user may be able to select the warning 1002 to access additional information about the issue, to troubleshoot the issue, or to retry a download or upgrade.

While not shown, in some examples, computing node(s), such as computing system 300 may be configured to execute a hypervisor, a controller virtual machine (VM) and one or more user VMs. The user VMs may be virtual machine instances executing on the computing system 300. The user VMs may share a virtualized pool of physical computing resources such as physical processors (e.g., hardware accelerators) and storage (e.g., local storage, cloud storage, and the like). The user VMs may each have their own operating system, such as Windows or Linux. Generally any number of user VMs may be implemented. User VMs may generally be provided to execute any number of applications which may be desired by a user.

While certain components are shown in the figures and described throughout the specification, other additional, fewer, and/or alternative components may be included in the system or other computing systems. Such additional, fewer, and/or alternative components are contemplated to be within the scope of this disclosure.

What is claimed is:

1. One or more non-transitory computer readable media encoded with instructions which, when executed by one or more processors of a system, cause the system to:
   connect with multiple service domains;
   determine that at least one service domain of the multiple service domains is eligible for upgrade;
   store an upgrade package for the at least one service domain at a storage service separate from the system, wherein the storage service comprises a container registry and a data repository;
   communicate access credentials to access the storage service, to the at least one service domain, wherein the access credentials comprise a first access credential providing the at least one service domain with access to the container registry, and a second access credential providing the at least one service domain with access to the data repository;
   receive a communication from the at least one service domain indicative of upgrade status responsive to the at least one service domain having accessed the upgrade package at the storage service using at least one of the first access credential or the second access credential; and
   update a state management database based on the communication.

2. The one or more non-transitory computer readable media of claim 1, wherein the multiple service domains include at least one cloud computing system service domain and at least one computing cluster service domain.

3. The one or more non-transitory computer readable media of claim 1, wherein the instructions further cause the system to:
   generate the upgrade package by confirming compatibility between a plurality of software elements included in the upgrade package, and the plurality of software elements forming a software stack.

4. The one or more non-transitory computer readable media of claim 1, wherein the determination that the at least one service domain is eligible for upgrade is further based on information about instances of applications executing at the at least one service domain.

5. The one or more non-transitory computer readable media of claim 1, wherein the instructions further cause the system to:
   display, via a manager interface in communication with the system, an indicator that the at least one service domain is eligible for upgrade; and
   wherein the access credentials to the storage service are communicated to the at least one service domain responsive to a command from a user to upgrade the at least one service domain.

6. The one or more non-transitory computer readable media of claim 1, wherein the container registry comprises service container images.

7. The one or more non-transitory computer readable media of claim 1, wherein the data repository comprises the upgrade package.

8. The one or more non-transitory computer readable media of claim 1, wherein the first access credential and the second access credential are different.

9. One or more non-transitory computer readable media encoded with instructions which, when executed by one or more processors of a service domain, cause the service domain to:
receive a communication from a cloud manager including access credentials to a storage service separate from the cloud manager, the storage service having an upgrade package, wherein the storage service comprises a container registry and a data repository, and wherein the access credentials comprise a first access credential providing the service domain with access to the container registry, and a second access credential providing the service domain with access to the data repository;
download, from the storage service, using the access credentials including at least one of the first access credential or the second access credential, selected items included in the upgrade package which are different from items located at a local memory of the service domain;
communicate download status of the upgrade package to the cloud manager during downloading of the selected items;
after download of the selected items, upgrade a software stack of the service domain using the selected items; and
communicate upgrade status for the service domain to the cloud manager at least in part during upgrading.

10. The one or more non-transitory computer readable media of claim 9, wherein the data repository comprises the upgrade package.

11. The one or more non-transitory computer readable media of claim 9, wherein the container registry comprises service container images.

12. The one or more non-transitory computer readable media of claim 9, wherein the instructions further cause the service domain to:
identify the selected items by comparing an upgrade directory of the upgrade package to an existing release directory at the service domain.

13. The one or more non-transitory computer readable media of claim 9, wherein the instructions further cause the service domain to:
schedule the download of the selected items based on a network status of a network used by the service domain to access the storage service.

14. The one or more non-transitory computer readable media of claim 9, wherein the instructions further cause the service domain to:
schedule the upgrade of the software stack based on predicted demand of the service domain.

15. The one or more non-transitory computer readable media of claim 9, wherein the service domain includes a plurality of clustered nodes, wherein successful download of the items in the upgrade package to the local memory of the service domain is shown when the selected items are accessible to each of the plurality of clustered nodes of the service domain.

16. The one or more non-transitory computer readable media of claim 9, wherein downloading the selected items comprises:
retrieving, from the container registry, docker images included in the upgrade package; and
downloading, from the data repository, release files for items included in the upgrade package.

17. The one or more non-transitory computer readable media of claim 9, wherein the instructions further cause the service domain to:
identify, based on communications with one or more geographically close service domains, additional items included in the upgrade package which are different from items located at a local memory of the one or more geographically close service domains;
download, from the storage service, using the access credentials, the additional items; and
provide the additional items to the one or more geographically close service domains.

18. The one or more non-transitory computer readable media of claim 17, wherein the one or more geographically close service domains communicate with the service domain using a wide area network including the service domain.

19. The one or more non-transitory computer readable media of claim 9, wherein the first access credential and the second access credential are different.

20. A method for managing software upgrades at a service domain, the method comprising:
generating an upgrade package for a software stack executing at the service domain;
storing the upgrade package for the software stack at a storage service comprising a container registry and a data repository;
identifying the service domain as eligible for upgrade based on the software stack and state information about the service domain stored at a cloud manager;
receiving a command at the cloud manager from a user to upgrade the service domain such that the software stack executing at the service domain includes software of the upgrade package;
initiating upgrade of the service domain by providing the service domain with access credentials to the storage service, wherein the access credentials comprise a first access credential providing the service domain with access to the container registry, and a second access credential providing the service domain with access to the data repository, wherein initiating the upgrade is based on using at least one of the first access credential or the second access credential, and wherein the service domain manages upgrade by downloading at least a portion of the upgrade package from the storage service;
updating the state information about the service domain responsive to communications from the service domain to the cloud manager that upgrade on the service domain was successful.

21. The method of claim 20, wherein generating the upgrade package comprises confirming compatibility between a plurality of software elements forming the software stack of the upgrade package.

22. The method of claim 20, wherein the state information is stored at a state management database of the cloud manager including state information associated with a plurality of service domains in communication with the cloud manager.

23. The method of claim 22, wherein the method further includes displaying state information for the plurality of service domains in communication with the cloud manager.

24. The method of claim 22, wherein the plurality of service domains in communication with the cloud manager include one or more computing cluster service domains and one or more cloud computing system service domains.

25. The method of claim 20, wherein the identification of the service domain as eligible for upgrade is further based on information about software installed at the service domain.

26. The method of claim 20, further comprising:
updating the state information about the service domain responsive to communications from the service domain to the cloud manager that the upgrade package was successfully downloaded to the service domain.

27. The method of claim 20, further comprising:
displaying, via a manager interface in communication with the cloud manager, a status of the service domain based on the state information about the service domain.

28. The method of claim 20, wherein the container registry comprises service container images.

29. The method of claim 20, wherein the data repository comprises the upgrade package.

30. The method of claim 20, wherein the first access credential and the second access credential are different.

* * * * *